US012763538B1

(12) United States Patent
Tran et al.

(10) Patent No.: US 12,763,538 B1
(45) Date of Patent: Oct. 13, 2026

(54) SYSTEMS, DEVICES, AND METHODS FOR WIRE HARNESS MANUFACTURING

(71) Applicant: InterConnect Wiring, L.L.P., Fort Worth, TX (US)

(72) Inventors: Nam D. Tran, Fort Worth, TX (US); Michael Janney, Fort Worth, TX (US)

(73) Assignee: Interconnect Wiring, L.L.P., Fort Worth, TX (US)

(*) Notice: Subject to any disclaimer, the term of this patent is extended or adjusted under 35 U.S.C. 154(b) by 0 days.

(21) Appl. No.: 19/276,902

(22) Filed: Jul. 22, 2025

(51) Int. Cl.
*H01R 43/02* (2006.01)

(52) U.S. Cl.
CPC ......... *H01R 43/0249* (2013.01); *H01R 43/02* (2013.01)

(58) Field of Classification Search
CPC ............................ H01R 43/0249; H01R 43/02
See application file for complete search history.

(56) References Cited

U.S. PATENT DOCUMENTS 2,926,231 A * 2/1960 Mcdowell ................ B23K 3/00 219/616
3,513,524 A * 5/1970 Allan ................. H01R 43/0249 29/749
4,852,252 A * 8/1989 Ayer .................. H01R 43/0242 174/DIG. 8
4,987,283 A * 1/1991 Beinhaur ............. B23K 3/0475 219/616
5,163,856 A * 11/1992 McGaffigan ......... B23K 3/0475 219/616
5,350,902 A * 9/1994 Fox ........................ H05B 6/105 219/670
5,519,192 A * 5/1996 Childs ................ H01R 43/0263 219/616
5,579,575 A * 12/1996 Lamome ................ H01R 4/723 219/605

(Continued)

FOREIGN PATENT DOCUMENTS

CN 106392230 B * 8/2019 ........... B23K 3/0475
EP 0371630 A1 * 6/1990 ........... B23K 3/0475
JP 2014165022 A * 9/2014

OTHER PUBLICATIONS

Translation of JP-2014165022-A (Year: 2014).*
Translation of CN-106392230-B (Year: 2019).*

*Primary Examiner* — Jeffrey T Carley
(74) *Attorney, Agent, or Firm* — Haynes and Boone, LLP

(57) ABSTRACT

A connector and wire connecting system may include an induction heater including an induction coil having a first terminal and a second terminal. The induction coil may be configured in a manner that an electric current flows through the induction coil from the first terminal to the second terminal, the electric current creating an electromagnetic field adjacent to the induction coil forming a heating zone. A wafer holder may be configured to support a multi-socket connector and a plurality of wires along a linear interface, each wire of the plurality of wires being independently connectable to a respective socket of the multi-socket connector, the interface being placeable within the heating zone. The induction coil may be disposed relative to the wafer holder and configured to heat the interface between the multi-socket connector and the plurality of wires within the heating zone.

22 Claims, 12 Drawing Sheets

(56) References Cited

U.S. PATENT DOCUMENTS

| | | | | |
|---|---|---|---|---|
| 6,271,507 | B2 * | 8/2001 | Godwin | B23K 1/002 219/676 |
| 8,931,684 | B2 * | 1/2015 | Nikkhoo | B23K 3/0475 219/616 |
| 2004/0112943 | A1 * | 6/2004 | Monson | B23K 37/04 228/180.21 |
| 2005/0199615 | A1 * | 9/2005 | Barber | B23K 3/04 219/672 |
| 2006/0086718 | A1 * | 4/2006 | Fukamachi | B23K 1/20 219/616 |
| 2008/0164248 | A1 * | 7/2008 | Reul | H05B 3/84 219/617 |
| 2009/0266811 | A1 * | 10/2009 | Kimbara | H05K 3/3494 219/616 |
| 2010/0038358 | A1 * | 2/2010 | Dingle | H10F 71/1375 219/616 |
| 2011/0163085 | A1 * | 7/2011 | Kalmbach | B23K 1/0016 219/616 |
| 2013/0186941 | A1 * | 7/2013 | Nikkhoo | H05K 13/0015 228/180.5 |
| 2015/0101189 | A1 * | 4/2015 | Paynter | H01R 43/02 29/860 |
| 2016/0276755 | A1 * | 9/2016 | Dai | H01R 43/02 |
| 2025/0239826 | A1 * | 7/2025 | Raybold | H01R 43/0263 |

* cited by examiner

SYSTEMS, DEVICES, AND METHODS FOR WIRE HARNESS MANUFACTURING

TECHNICAL FIELD

The present disclosure relates generally to systems, devices, and methods for connecting a wire to a connector as may be done in wire harness manufacturing. More particularly, the present disclosure relates generally to systems, devices, and methods for efficiently applying heat to solder wires to a wafer connector in a wire harness.

BACKGROUND

Wire harness manufacturing generally requires a significant amount of detail and precision for effective wire attachment. Some wire harnesses can include a wafer connector which interfaces with, for example, 10 to 20 different wires. Manually soldering each of these wires to the wafer connector can consume significant amounts of time and can require a high degree of manufacturing skill for successful soldering. Thermally isolating each of the individual wires for even heating can also be challenging and time consuming because of the small distance between the wire interface points on the wafer connector. Often, the protective insulation will need to be adjusted for the soldering of each individual wire so that excess heat does not adversely affect the adjacent wires. Thus, there remains a need for effective systems and methods for to efficiently apply heat to solder wires to a wafer connector in a wire harness.

SUMMARY

Embodiments of the present disclosure include systems, devices, and methods of efficiently applying heat to solder wires to a wafer connector in a wire harness.

In some examples, a connector and wire connecting system may include an induction heater including an induction coil having a first terminal and a second terminal. The induction coil may be configured in a manner that an electric current flows through the induction coil from the first terminal to the second terminal, the electric current creating an electromagnetic field adjacent to the induction coil forming a heating zone. The connector and wire connecting system may further include a wafer holder configured to support a multi-socket connector and a plurality of wires along a linear interface, each wire of the plurality of wires being independently connectable to a respective socket of the multi-socket connector, the interface being placeable within the heating zone. The induction coil may be disposed relative to the wafer holder and configured to heat the interface between the multi-socket connector and the plurality of wires within the heating zone.

In some examples, a connector and wire connecting system may include an induction heater comprising an induction coil. The connector and wire connecting system may further include a lift assistance device which may include a structural base support. The lift assistance device may further include a working end displaceable relative to the structural base support, the working end carrying the induction coil and comprising a first alignment structure. The lift assistance device may further include a connecting member which operatively couples the working end with the structural base support, the connecting member configured to allow for multi-planar movement of the working end relative to the structural base support. The connector and wire connecting system may further include a wafer holder configured to support a wafer, the wafer holder comprising a second alignment structure and configured to facilitate the coupling of a plurality of wires with the wafer at an interface. The multi-planar movement of the working end may be configured to allow for the first alignment structure to couple with the second alignment structure in manner that positions the induction coil for heating the interface.

In some examples, a method of connecting a connector and wires may include securing a connector to a wafer holder. The method may further include interfacing a plurality of wires with the connector at an interface. The method may further include positioning, using a connecting member, a working end relative to a structural base in a manner that a first alignment structure of the working end couples with a second alignment structure of the wafer holder, the working end carrying an induction coil. The method may further include activating a power supply to flow current from a first terminal to a second terminal of the induction coil to create an electromagnetic field and heat the interface to electrically couple each wire of the plurality of wires to the connector.

In some examples, a connector and wire connecting system may include an induction heater comprising an induction coil having a first terminal and a second terminal. The induction coil may be configured in a manner that an electric current flows through the induction coil from the first terminal to the second terminal, the electric current creating an electromagnetic field adjacent to the induction coil forming a linearly extending heating zone adjacent to and not between the induction coil. The connector and wire connecting system may further include a multi-socket connector with a plurality of wires along a linear interface, each wire of the plurality of wires being independently connectable to a respective socket of the multi-socket connector along a linear interface length, the heating zone having a linear length the same as or greater than the linear interface length. The induction coil may be disposed relative to the multi-socket connector and configured to heat the linear interface between the multi-socket connector and the plurality of wires within the heating zone.

Additional aspects, features, and advantages of the present disclosure will become apparent from the following detailed description.

BRIEF DESCRIPTION OF THE DRAWINGS

The accompanying drawing figures incorporated in and forming a part of this specification illustrate several aspects of the disclosure, and together with the description, serve to explain the principles of the disclosure.

DETAILED DESCRIPTION

Figure 1:
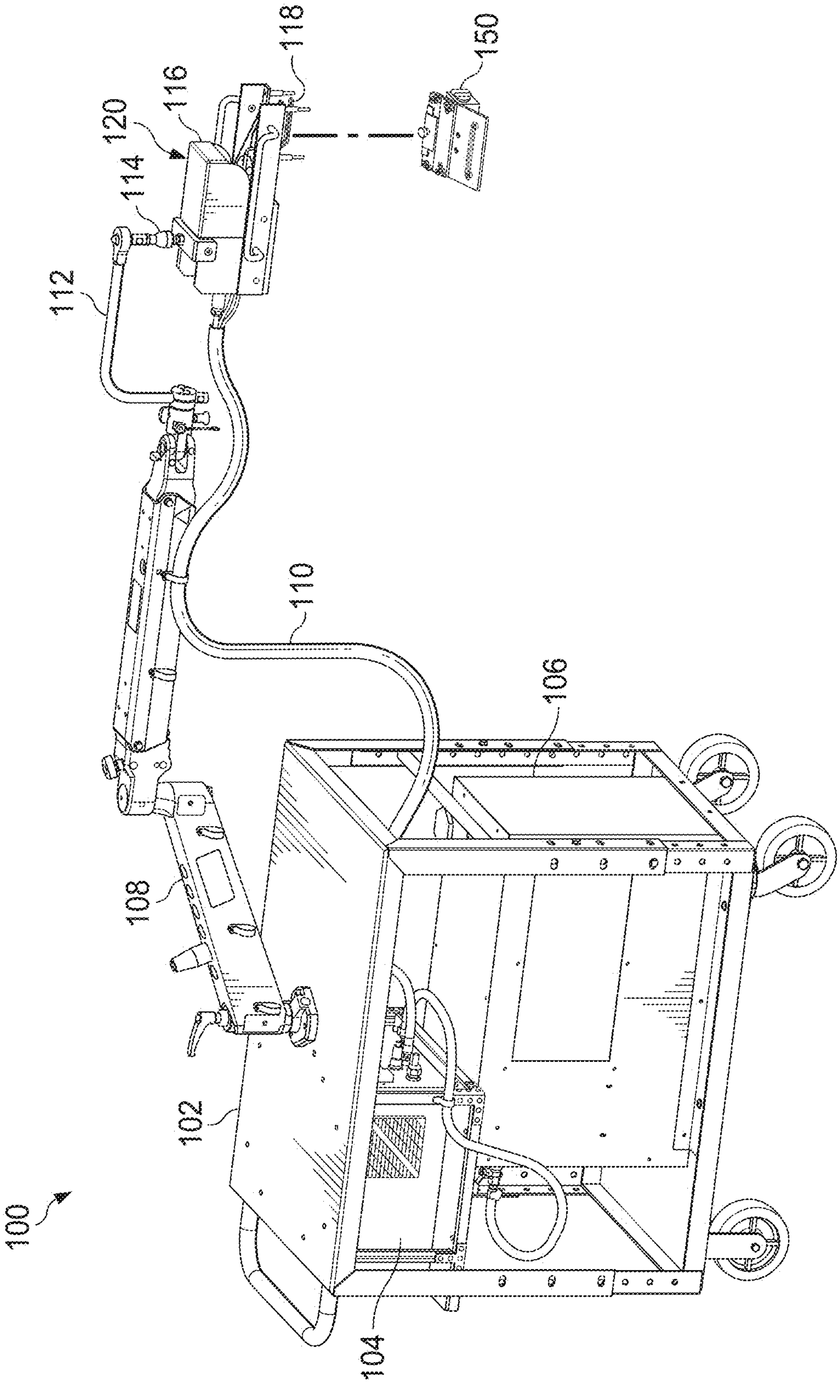
FIG. 1 is a perspective view of an example induction heating system, according to some aspects of the present disclosure.

For the purposes of promoting an understanding of the principles of the present disclosure, reference will now be made to the example embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Disclosed herein are systems, devices, and methods for efficiently applying heat to solder wires to a wafer connector in a wire harness. The induction heating system discussed herein expediently may apply evenly distributed inductive heating to all of the wires of the wafer connector simultaneously. In some examples, the induction heating system may significantly reduce the total time required to manufacture a wire harness. In some examples, the total time required to manufacture a wire harness has been reduced by up to 80%, although even higher efficiencies may be realized. Thus, the induction heating system discussed herein allows for significant time and efficiency improvements over manual wire harness manufacturing.

While some induction heaters are helically shaped and apply heat to the interior of the coil, the coil discussed herein allows for the lateral application of induction heating. By spacing two elongated portions of the coil parallel to each other and in close proximity together, the system creates a strong, evenly distributed, and precisely controllable heating zone that can be applied to the interface between wires and a wafer connector. The user can accurately control a number of parameters of the coil including, for example, frequency, current, voltage, power, exposure distance, exposure time, cooling water temperature, and/or cooling water flow rate to finely adjust the thermal gradient of the heat zone. The induction coil is capable of producing high quality soldering at relatively low coil temperatures (e.g., less than 125 to 150 degrees Fahrenheit for induction coil operating temperature) reducing safety risks during manufacturing.

The supporting apparatus of the coil is itself adjustable to allow for omnidirectional movement of the coil relative to the wire harness position. This restriction-free movement capability allows the user to easily guide the coil into alignment with the wire harness. To assist in alignment, the head apparatus supporting the coil may include an alignment structure which can couple with an alignment structure of the wafer connector support stand to precisely and reliably align the coil with the interface between the wires and the wafer connector.

The articulating arm structure allows for three-dimensional movement of the coil relative to the supporting cart. Additionally, the robust articulating joints of the articulating arm allow the user to seamlessly and fluidly guide the relatively heavy coil and power supply into alignment with insignificant physical exertion.

Once the coil is aligned with the wafer connector stand, the user can initiate a pre-programed set of heat application parameters specifically tuned to optimize heating of a specific wire harness configuration. Once a pre-set heating timer is completed, the user can easily remove the coil away from the wire harness to allow for a quick turnaround time before proceeding to the next wire harness in a batch of wire harness assemblies.

Induction heating is a modern and efficient method to reflow solder for wafer connectors. This technology offers several advantages over conventional soldering techniques for manufacturing wire harness assemblies. Some of the advantages include:

Precision and Consistency: Induction heating may provide precise control over the heating process, ensuring uniform temperature distribution. This may result in consistent and high-quality solder joints, reducing the risk of cold solder joints or overheating.

Speed and Efficiency: Induction heating may significantly reduce the time required for reflow soldering. In some examples, the process can be completed in seconds, enhancing productivity and allowing for faster assembly lines. In some examples, rapid heating also may minimize thermal stress on the components, preserving their integrity.

Focused Heat Application: The induction heating process can target specific areas, reducing heat exposure to surrounding components. This focused application may reduce the risk of damage to solder sleeves, wafer connector, sensitive parts and maintains the overall quality of the assembly.

Cost-Effectiveness: Induction heating may be energy-efficient, as it can directly heat the solder joint without wasting energy on heating the entire component, in some examples. This efficiency may translate to lower operational costs and reduced energy consumption.

Versatility: Induction heating can be used for various sizes and types of wafer connectors. It can be adapted to different manufacturing requirements, making it a versatile solution for diverse applications.

Environmental Benefits: Induction heating can be a clean process that may not produce harmful emissions. It may contribute to a safer working environment and may align with sustainable manufacturing practice. It also may reduce the risk of sparking in hazardous environments.

FIG. 1 is a is a perspective view of an example induction heating system 100, according to some aspects of the present disclosure. Depending on the implementation, the induction heating system 100 may also be referred to as a system, an apparatus, a wire harness manufacturing system, and/or any other suitable term. In some example implementations, the induction heating system 100 may include some or all of a cart 102, a controller 104, a water chiller 106, an arm assembly 108, one or more cables 110, an L-bar 112, a fifth joint 114, a power supply 116, a coil 118, a head assembly 120, and/or a stand 150.

In some aspects, the fifth joint 114 may be a pivot joint. In some aspects, the fifth joint 114 may allow the head assembly 120 to align with the stand 150 at a particular angle as discussed further herein. The fifth joint 114 may also be referred to as a pin, a pin joint, a revolute joint, a rotational joint, a pivot joint, a rotary joint, a bearing, a cylinder joint, a full joint, and/or any other suitable term. It should be understood, however, that depending on the implementation, the fifth joint 114 may be any type of joint including, for example, a swivel joint, a prismatic joint, a ball joint, a cotterpin, a bolted joint, a screw joint, a universal joint, and/or any other type of joint. In some aspects, the fifth joint 114 may have a range of rotation between at least 10 and 60 degrees, and in some implementations, the fifth joint 114 may have about 40 degrees of rotation.

Figure 2:
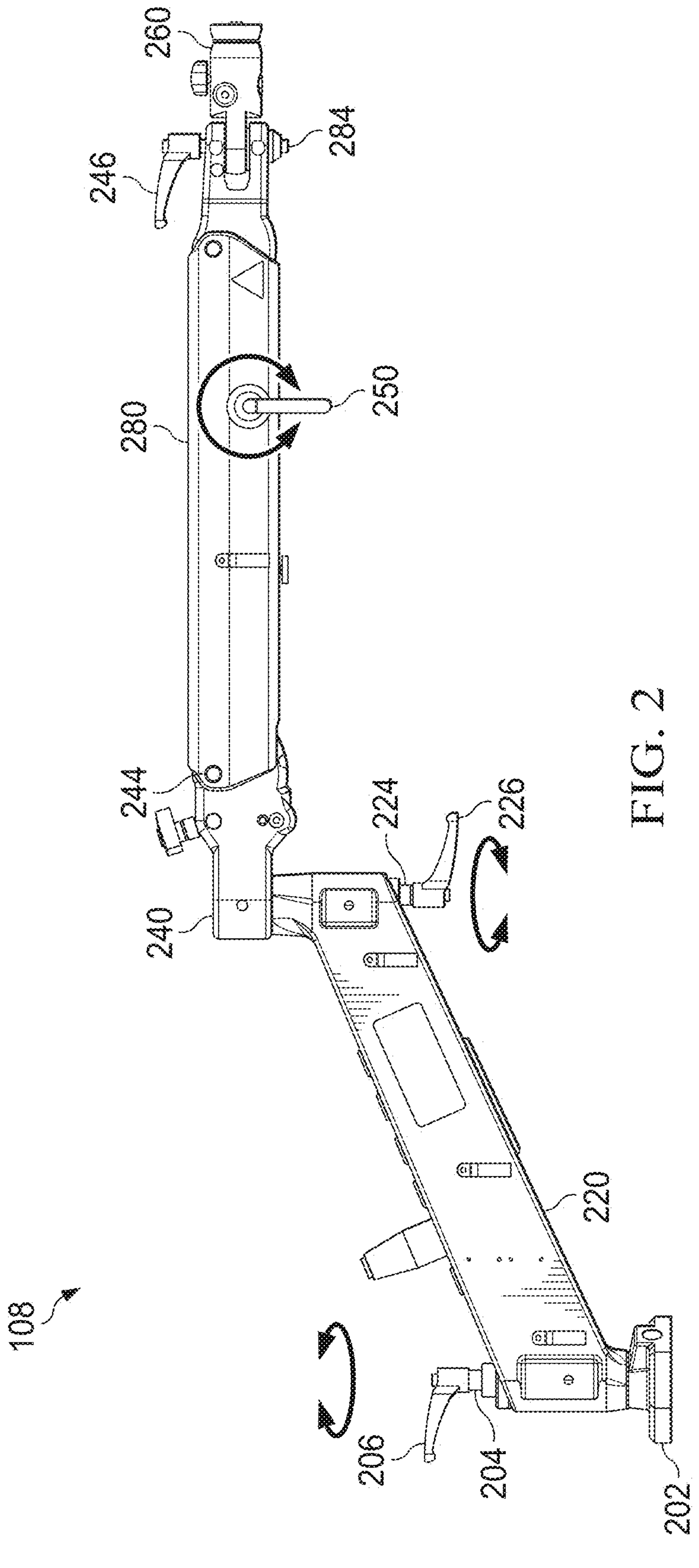
FIG. 2 is a side view of an example arm assembly, according to some aspects of the present disclosure.

FIG. 2 is a side view of an example arm assembly 108, according to some aspects of the present disclosure. Depending on the implementation, the arm assembly 108 may also be referred to as an arm, a connecting member, a lift assistance device, a lift arm, a pivot arm, an articulated arm, and/or any other suitable term. The arm assembly 108 may include some or all of a base stand 202, a first joint 204, a first release handle 206, a proximal arm 220, a second joint 224, a second release handle 226, a central arm 240, a third joint 244, a third release handle 250, a fourth release handle 246, a fourth joint 284, an L-bar mounting bracket 260, and/or a distal arm 280.

The proximal arm 220 may move relative to the base stand 202 about the first joint 204. The base stand 202 may be secured to the cart 102. In some aspects the base stand 202 may be positioned exactly or substantially at the center of the top surface of the cart 102. In some aspects, the proximal arm 220 may pivot or rotate relative to the base stand 202 about the first joint 204. Thus, in some aspects, the proximal arm 220 may be pivotably or rotatably coupled to the base stand 202 about first joint 204. In some aspects, the bottommost portion of the proximal arm 220 may rotate about the first joint 204 and/or the base stand 202 in a fully or substantially horizontal plane. It should be understood, however, that depending on the implementation, the first joint 204 may be any type of joint including, for example, a prismatic joint, a ball joint, a cotterpin, a bolted joint, a screw joint, a universal joint, and/or any other type of joint. In some aspects, the longitudinal axis of the proximal arm 220 may be positioned diagonally relative to a horizontal plane and/or the longitudinal axis of the proximal arm 220 may have a cone-shaped rotational path as the proximal arm 220 rotates about the first joint 204.

The first joint 204 may also be referred to as a pin, a pin joint, a revolute joint, a rotational joint, a pivot joint, a rotary joint, a bearing, a cylinder joint, a full joint, and/or any other suitable term. It should be understood, however, that depending on the implementation, the first joint 204 may be any type of joint including, for example, a swivel joint, a prismatic joint, a ball joint, a cotterpin, a bolted joint, a screw joint, a universal joint, and/or any other type of joint. In some aspects, the first joint 204 may have 360 degrees of rotation.

In some aspects, the arm assembly 108 may include a first release handle 206 operatively coupled to the first joint 204 which may unlock and lock the first joint 204. The first release handle 206 may also be referred to as a base radial lock, a lock, a release, a handle, and/or any other suitable term. In some aspects, actuating the first release handle 206 allows for the proximal arm 220 to pivot or rotate about the first joint 204; then actuating the first release handle 206 again will lock the first joint 204 preventing the proximal arm 220 from rotating or pivoting about the first joint 204. In some aspects, the first release handle 206, upon actuation from the user, allows the user to guide the proximal arm 220 relative to the first joint 204.

The second joint 224 may also be referred to as a pin, a pin joint, a revolute joint, a rotational joint, a pivot joint, a rotary joint, a bearing, a cylinder joint, a full joint, and/or any other suitable term. It should be understood, however, that depending on the implementation, the second joint 224 may be any type of joint including, for example, a swivel joint, a prismatic joint, a ball joint, a cotterpin, a bolted joint, a screw joint, a universal joint, and/or any other type of joint. In some aspects, the second joint 224 may have 360 degrees of rotation.

In some aspects, the arm assembly 108 may include a second release handle 226 operatively coupled to the second joint 224 which may unlock and lock the first joint 204. The second release handle 226 may also be referred to as a cross radial lock, a lock, a release, a handle, and/or any other suitable term. In some aspects, actuating the second release handle 226 allows for the central arm 240 to pivot or rotate about the second joint 224; then actuating the second release handle 226 again will lock the second joint 224 preventing the central arm 240 from rotating or pivoting about the second joint 224. In some aspects, the second release handle 226, upon actuation from the user, allows the user to guide the central arm 240 relative to the second joint 224.

The third joint 244 may also be referred to as a pin, a pin joint, a revolute joint, a rotational joint, a pivot joint, a rotary joint, a bearing, a cylinder joint, a full joint, and/or any other suitable term. It should be understood, however, that depending on the implementation, the third joint 244 may be any type of joint including, for example, a swivel joint, a prismatic joint, a ball joint, a cotterpin, a bolted joint, a screw joint, a universal joint, and/or any other type of joint. In some aspects, the third joint 244 may have 90 degrees of rotation.

In some aspects, the arm assembly 108 may include a third release handle 250 operatively coupled to the third joint 244 which may unlock and lock the third joint 244. The third release handle 250 may also be referred to as an arm titling lock, a lock, a release, a handle, and/or any other suitable term. In some aspects, actuating the third release handle 250 allows for the distal arm 280 to pivot about the third joint 244; then actuating the third release handle 250 again will lock the third joint 244 preventing the distal arm 280 from pivoting about the third joint 244. In some aspects, the third release handle 250, upon actuation from the user, allows the user to guide the distal arm 280 up and down relative to the third joint 244.

The fourth joint 284 may also be referred to as a pin, a pin joint, a revolute joint, a rotational joint, a pivot joint, a rotary joint, a bearing, a cylinder joint, a full joint, and/or any other suitable term. It should be understood, however, that depending on the implementation, the fourth joint 284 may be any type of joint including, for example, a swivel joint, a prismatic joint, a ball joint, a cotterpin, a bolted joint, a screw joint, a universal joint, and/or any other type of joint. In some aspects, the fourth joint 284 may have 270 degrees of rotation.

In some aspects, the arm assembly 108 may include a fourth release handle 246 operatively coupled to the fourth joint 284 which may unlock and lock the fourth joint 284. The fourth release handle 246 may also be referred to as a head lock, a lock, a release, a handle, and/or any other suitable term. In some aspects, actuating the fourth release handle 246 allows for the L-bar mounting bracket 260 and the L-bar 112 to pivot about the fourth joint 284; then actuating the fourth release handle 246 again will lock the fourth joint 284 preventing the L-bar mounting bracket 260 from pivoting about the fourth joint 284. In some aspects, the fourth release handle 246, upon actuation from the user, allows the user to guide the L-bar mounting bracket 260 relative to the fourth joint 284.

In some aspects, the L-bar mounting bracket 260 may include an attachment structure to allow the L-bar 112 to attach to the arm assembly 108. Thus, in some aspects, the L-bar mounting bracket 260 allows for the L-bar 112 to pivot relative to the fourth joint 284.

In some aspects, the arm assembly 108 allows for the free and unrestricted movement in three dimensions of the head assembly 120 and the coil 118.

Figure 3:
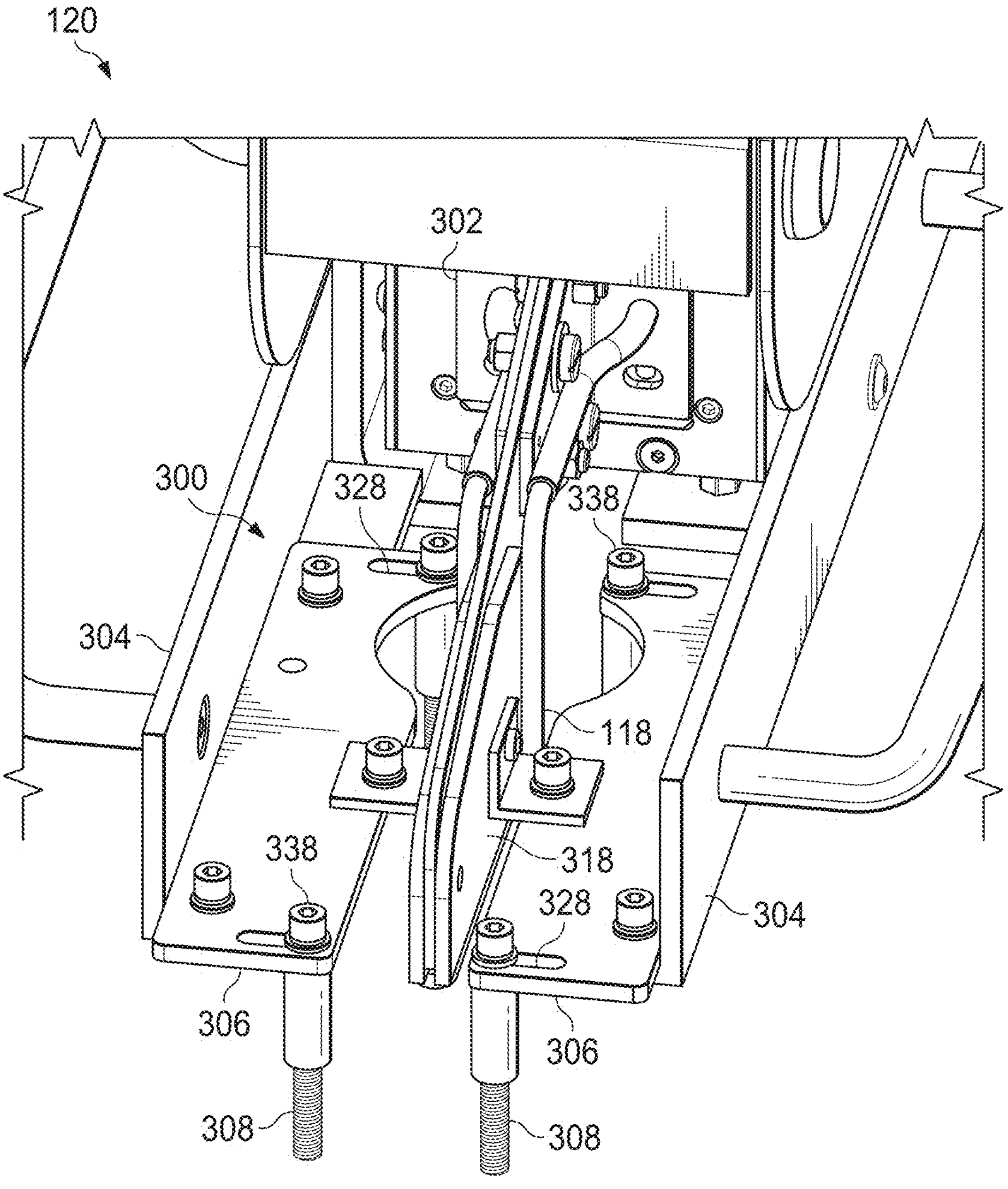
FIG. 3 is a perspective view of an example head assembly, according to some aspects of the present disclosure.

FIG. 3 is a perspective view of an example head assembly 120, according to some aspects of the present disclosure. The head assembly may also be referred to as a head, a work head, a distal portion, a coil housing, and/or any other suitable term. The head assembly 120 may include some or all of the coil 118, an alignment assembly 300, a coil mounting bracket 302, one or more side plates 304, one or more bottom plates 306, one or more guide pins 308, a coil support 318. The head assembly 120 may be positioned at the distal end of the induction heating system 100 and the arm assembly 108. In some aspects, the head assembly 120 may be coupled to the fifth joint 114, the L-bar 112, the third joint 244, the distal arm 280, and/or any other part of the arm assembly 108.

Depending on the implementation, the coil 118 may also referred to as an induction coil, an induction heating coil, and/or any other suitable term. In some aspects, the coil 118 may be secured to the head assembly 120 by the coil mounting bracket 302 at one or more points or contact. In some aspects, the distal end of the coil 118 may be positioned a distance below the one or more bottom plates 306 and/or the one or more side plates 304. In some aspects, the proximal end of the coil 118 may be positioned a distance above the one or more bottom plates 306 and/or the one or more side plates 304. In some aspects, the proximal end of the coil 118 may be mounted to the coil mounting bracket 302 at least partially a distance above the one or more bottom plates 306 and/or the one or more side plates 304. In some aspects, a central portion of the coil 118 may be positioned at least partially above and at least partially below the one or more bottom plates 306 and/or the one or more side plates 304.

The alignment assembly 300 may include some or all of the one or more side plates 304, the one or more bottom plates 306, and/or one or more guide pins 308. The alignment assembly 300 may be used to align the coil 118 with the stand 150 to perform induction heating.

Depending on the implementation, the alignment assembly 300 may include any number of guide pins 308 including, for example, one guide pin, two guide pins, three guide pins, four guide pins, six guide pins, and/or any other suitable number of guide pins. The one or more guide pins 308 may be used to align the coil 118 and/or the head assembly 120 with the stand 150 as discussed in more detail further herein. In some aspects, a guide pin 308 may be secured in a slot 328 by a fastener 338. Thus, in some aspects, the head assembly 120 may include one or more slots 328 which may be positioned on the one or more side plates 304, the one or more bottom plates 306, and any other position on the head assembly 120. Thus, in some aspects, the head assembly 120 may include one or more fasteners 338 which may be positioned on the one or more side plates 304, the one or more bottom plates 306, and any other position on the head assembly 120. Depending on the implementation, the one or more slots 328 may be any size and/or shape including, for example, slot shaped, circular, triangular, rectangular, and/or any other suitable shape. The one or more fasteners 338 may be any type of fastener including, for example, a screw, an internal hex screw, a flange head screw, a pin head screw, a phillips head screw, a flat head screw, an external hex screw, a star head screw, a full-bearing screw, a square head screw, a socket head screw, a knurled head screw, and/or any other type of suitable fastener. In some aspects, one or more washers or one or more bearings may be positioned between the head of the one or more fasteners 338 and the edges of the one or more slots 328. In some aspects, the tail or distal end of the one or more fasteners 338 may act in place of the one or more guide pins 308 to align the coil 118 and/or the head assembly 120 with the stand 150. Thus, in some aspects, the tail of the one or more fasteners 338 may be non-threaded. The guide pins 308 may be loosened by rotating or otherwise actuating the fasteners 338, then adjusted along the slots 328 to a desired location, and then tightened to maintain the guide pins 308 in the desired location along the slots.

Depending on the implementation, the coil support 318 may also be referred to as a member, a support, a support member, a heater coil support, and/or any other suitable term. The coil support 318 may support the coil 118 and/or hold the coil 118 in place with respect to the rest of the head assembly 120. In some aspects, the coil support 318 may be mounted to the head assembly 120 by the coil mounting bracket 302. In some aspects, at least a portion of the coil support 318 may generally contour the outer edge of at least a portion of the coil 118. The coil 118 may be secured to the coil support 318 by one or more fasteners. In some aspects, the coil support may be secured directly to or in a fixed relationship relative to the one or more bottom plates 306 and/or the one or more side plates 304.

Figure 4:
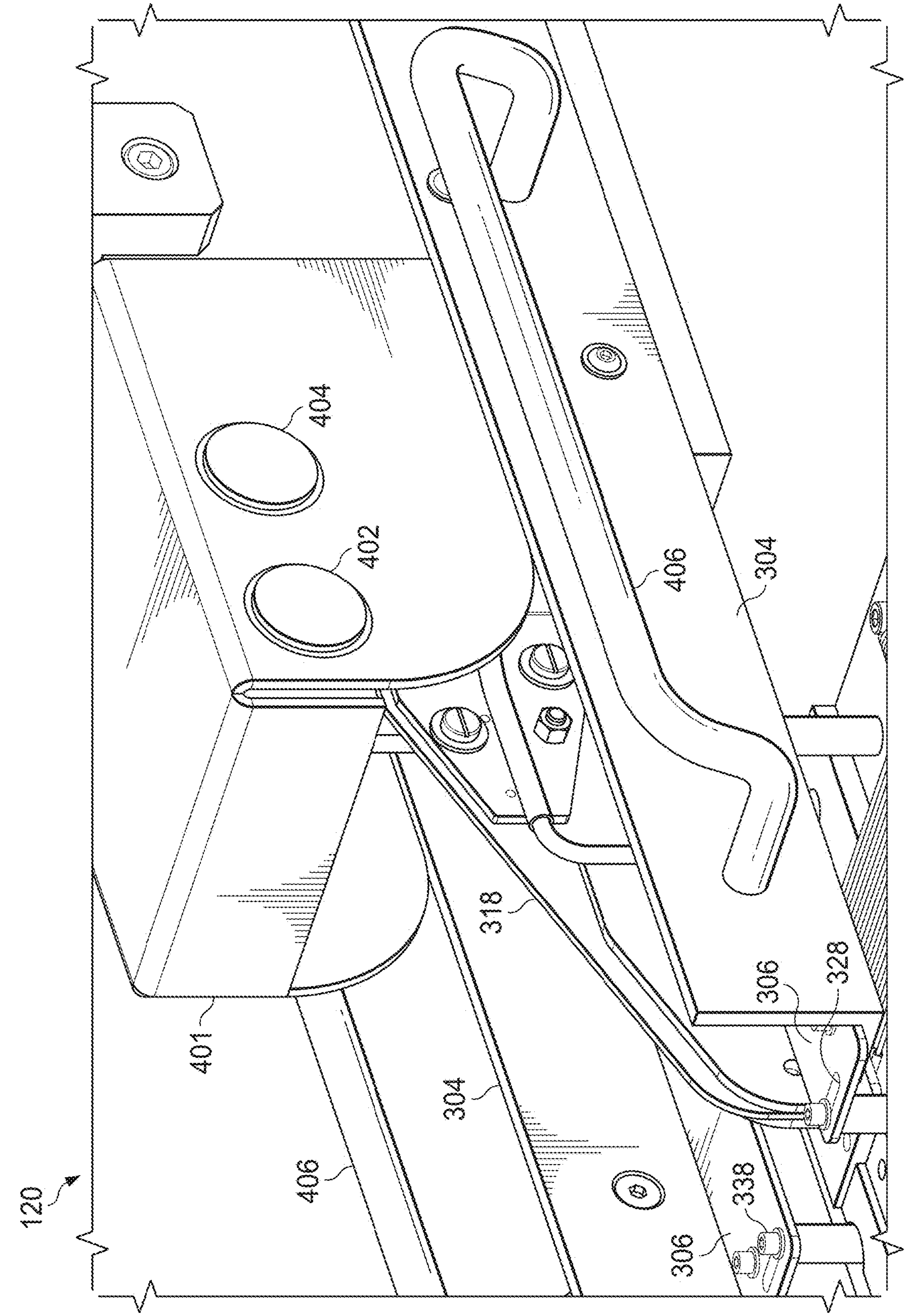
FIG. 4 is a perspective view of an example head assembly, according to some aspects of the present disclosure.

FIG. 4 is a perspective view of another portion of the example head assembly 120, according to some aspects of the present disclosure. In some aspects, the head assembly 120 may include some or all of a cover 401 with a start button 402 and a stop button 404, and also may include one or more guide handles 406. It should be understood that, in some aspects, instead of a start button 402 and a stop button 404, the head assembly may instead include a start/stop button (not shown). The start/stop button may start the heating of the coil 118 when the heating is off and may stop the heating of the coil 118 when the heating is on.

Depending on the implementation, the start button 402 may also be referred to as an actuator, a first actuator, and/or any other suitable term. The start button 402 may turn on the induction heating system causing the power supply 116 to begin and/or continue to transmit an electric current to the coil 118 to cause heating of the coil 118. Thus, the start button 402 may include wiring for electrically coupling the start button 402 to other parts of the induction heating system 100 including, for example, the controller 104, the water chiller 106, the one or more power cables 110, the power supply 116, the coil 118, and/or the stand 150. In some aspects, the start button 402 may be electrically coupled to an antenna, transmitter, and/or transceiver to wirelessly transmit the start command to other parts of the induction heating system 100 including, for example, the controller 104, the water chiller 106, the one or more power cables 110, the power supply 116, the coil 118, the stand 150, a user interface, a computer, a mobile device, a smartphone, a tablet, and/or a processor. It should be understood that, in some aspects, the start button 402 may be included in addition to or be replaced by an antenna, receiver, and/or transceiver to wirelessly receive the start command from other parts of the induction heating system 100 including, for example, the controller 104, the water chiller 106, the one or more power cables 110, the power supply 116, the coil 118, the stand 150, a user interface, a computer, a mobile device, a smartphone, a tablet, and/or a processor. It should be understood that, in some aspects, the start button 402 may instead be any other type of actuator including, for example, a switch, a lever, a toggle, a rocker, a rotary, a dial, part of a keyboard, part of the graphical user interface (GUI) of a touchscreen or software, and/or and other suitable actuation device. It should be understood that, in some aspects, the start button 402 may positioned on any portion of the head assembly 120 and/or the induction heating system 100 including, for example, the cart 102, the controller 104, the water chiller 106, the arm assembly 108, the one or more power cables 110, the power supply 116, the coil 118, the stand 150, and/or any other suitable position. In some aspects, the start button 402 may include a marking on or near the start button 402 to indicate to a user that the start button 402 is a start button including, for example, the color green, a green LED, a label "start," the power symbol, wording, lettering, numbering, and/or any other suitable marking. In some aspects, the green LED may turn on or blink to indicate the start button 402 is on and turn off to indicate that the start button 402 is off.

Depending on the implementation, the stop button 404 may also be referred to as an actuator, a second actuator, and/or any other suitable term. The stop button 404 may turn off the induction heating system causing the power supply 116 to stop transmitting the electric current to the coil 118 to stop heating of the coil 118. Thus, the stop button 404 may include wiring for electrically coupling the stop button 404 to other parts of the induction heating system 100 including, for example, the controller 104, the water chiller 106, the one or more power cables 110, the power supply 116, the coil 118, and/or the stand 150. In some aspects, the stop button 404 may be electrically coupled to an antenna, transmitter, and/or transceiver to wirelessly transmit the stop command to other parts of the induction heating system 100 including, for example, the controller 104, the water chiller 106, the one or more power cables 110, the power supply 116, the coil 118, the stand 150, a user interface, a computer, a mobile device, a smartphone, a tablet, and/or a processor. It should be understood that, in some aspects, the stop button 404 may be included in addition to or be replaced by an antenna, receiver, and/or transceiver to wirelessly receive the stop command from other parts of the induction heating system 100 including, for example, the controller 104, the water chiller 106, the one or more power cables 110, the power supply 116, the coil 118, the stand 150, a user interface, a computer, a mobile device, a smartphone, a tablet, and/or a processor. It should be understood that, in some aspects, the stop button 404 may instead be any other type of actuator including, for example, a switch, a lever, a toggle, a rocker, a rotary, a dial, part of a keyboard, part of the GUI of a touchscreen or software, and/or and other suitable actuation device. It should be understood that, in some aspects, the stop button 404 may positioned on any portion of the head assembly 120 and/or the induction heating system 100 including, for example, the cart 102, the controller 104, the water chiller 106, the arm assembly 108, the one or more power cables 110, the power supply 116, the coil 118, the stand 150, and/or any other suitable position. In some aspects, the stop button 404 may include a marking on or near the stop button 404 to indicate to a user that the stop button 404 is a stop button including, for example, the color red, a red LED, a label "stop," the power symbol, wording, lettering, numbering, and/or any other suitable marking. In some aspects, the red LED may turn on or blink to indicate the stop button 404 has been actuated and turn off immediately or after a period of time to indicate that the stop button 404 is no longer being pressed.

In some aspects, actuating the start button 402 may begin heating of the coil 118 for a pre-set amount of time. Thus, in some aspects, the heating will automatically stop at the end of the heating cycle. Thus, in some aspects, the stop button 404 may be optional, unnecessary, or used as an emergency off button. In some aspects, the controller 104 or another part of the induction heating system 100 may display a timer which may countdown the time remaining for the current heating cycle.

The one or more guide handles 406 may be used by the user to change the position of the head assembly 120 relative to the cart 102, the stand 150, and/or the ground (not shown) as discussed in more detail herein. For example, the user may grab one of the one or more guide handles to guide the head assembly 120 into alignment with the stand 150.

Figure 5:
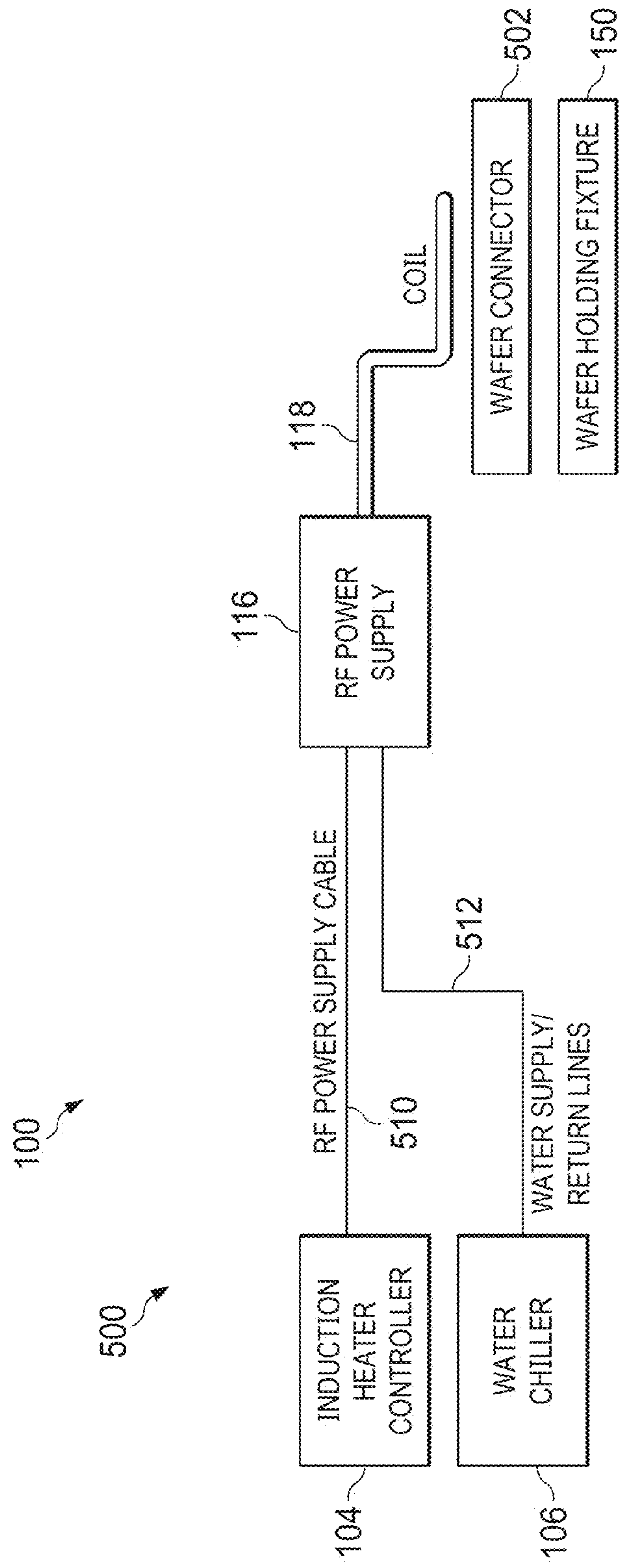
FIG. 5 is a block diagram of an example induction heating system, according to some aspects of the present disclosure.

FIG. 5 is a block diagram 500 of an example induction heating system 100, according to some aspects of the present disclosure. In some aspects, the controller 104 may be electrically coupled with the power supply 116 and the coil 118 such that the controller 104 may transmit electrical current through the power supply 116 and through the coil 118. In some aspects, the controller 104 may operate the power supply by sending an actuating command to turn of the power of the power supply 116 which causes the power supply 116 to send an electrical current to the coil 118. Thus, in some aspects, the electrical current may originate in the power supply 116 and transmit from the power supply 116 to the coil 118.

In some aspects, the induction heating system 100 may be controlled by a controller 104. The controller 104 may actuate the power supply 116. In some aspects, the controller may actuate the power supply 116 by supplying power by one or more power supply cables 510. In some aspects, the power supplied by the power supply cables 510 may be an radio frequency (RF) power supply. In some aspects, the controller 104 may be an UltraFlex Induction Heater Controller and/or the power supply 116 may be UltraFlex Power Supply, which is operatively coupled to the UltraFlex Induction Heater Controller.

In some aspects, the water chiller 106 may be fluidly coupled to the power supply 116 and/or the coil 118 such that the water chiller 106 pumps a fluid, such as water, to the power supply 116 and/or to the coil 118. In some aspects, warm fluid returns from the coil 118 and/or the power supply 116 to the water chiller 106 to be cooled by the water chiller 106 and potentially returned into circulation. In some aspects, the water chiller 106 receives water from an external source and the warm water form the coil 118 is allowed to drain as waste water. In some aspects, the water chiller 106 pumps fluid directly to the coil 118 bypassing the power supply 116. In some aspects, the water chiller 106 may be an UltraFlex Water Chiller Unit.

In some aspects, the induction heating system 100 further includes fluid supply and return cables 512 which facilitate the pumping of fluid back and forth between the water chiller 106 and the power supply 116 and the coil 118.

It should be understood that, depending on the implementation, the fluid supply and return cables 512 may be routed together with the one or more power cables 510 (e.g., see cables 110) or separately from the one or more power cables 510. In some aspects, the fluid supply and return cables 512 and the one or more power cables 510 may be routed fully or substantially through the inside of the arm assembly 108. In some aspects, the fluid supply and return cables 512 and the one or more power cables 510 may be routed fully or substantially along the side of the arm assembly 108.

In some aspects, the coil 118 may be electrically coupled to the power supply 116 such that the power supply 116 may supply an electrical current through the coil 118. In some aspects, the power supply 116 may be an RF power supply.

Figure 6:
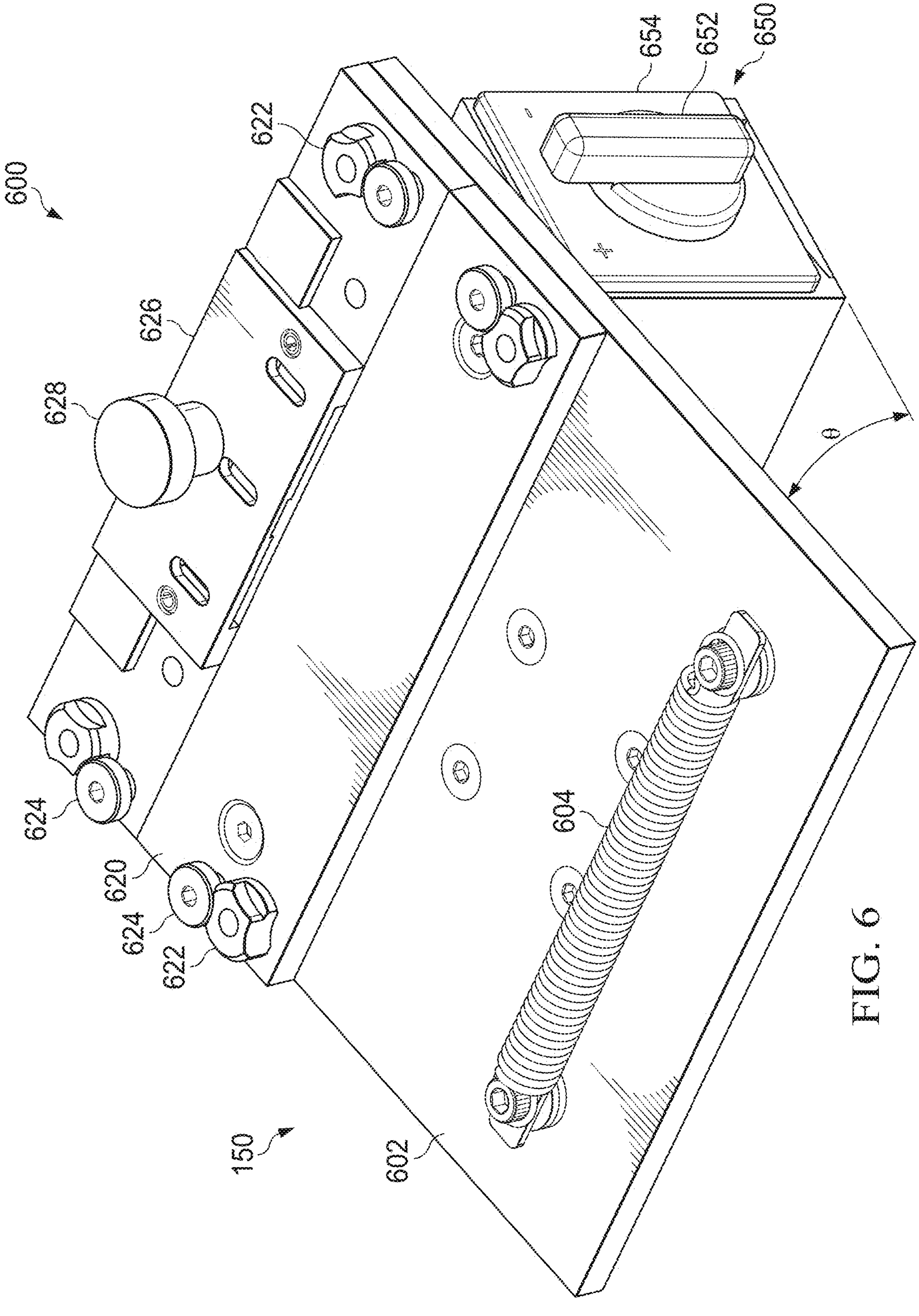
FIG. 6 is a perspective view of an example manufacturing assembly, according to some aspects of the present disclosure.

FIG. 6 is a perspective view of an example manufacturing assembly 600, according to some aspects of the present disclosure. The manufacturing assembly 600 may include a stand 150 and/or a magnet 650. In some aspects, the magnet 650 may be positioned under the stand 150. In some aspects, the magnet 650 may be positioned under the stand 150 such that the stand 150 is angled at angle θ. In some aspects, the stand 150 may be angled to help assemblers maintain a more natural posture, reducing neck, back strain, and/or eye strain. Angle θ may be defined as the angle of the bottom surface of the stand 150 relative to horizontal. Depending on the implementation, angle θ may be any value including, for example, between 0 and 90 degrees, between 10 and 60 degrees, between 10 and 50 degrees, between 10 and 30 degrees, 20 degrees, and/or any other suitable range of angles or angle. In some aspects, the stand 150 may include an adjustment structure (not shown) which may allow a user to adjust angle θ even when the magnet 650 is a fixed height.

In some aspects, the fifth joint 114 (FIG. 1) may be adjusted to angle the head assembly 120 at the same angle θ (FIG. 6) relative to horizontal as the angle θ of the stand 150. Thus, in some aspects, the fifth joint 114 may facilitate alignment with the stand 150 by allowing for pivotable adjustment of the head assembly 120. It should be understood that, depending on the implementation, the fifth joint may be adjustable at any angle relative to horizontal including, for example, between 90 degrees below horizontal and 90 degrees above horizontal, between 45 degrees below horizontal and 45 degrees above horizontal, between 30 degrees below horizontal and 30 degrees above horizontal, between 20 degrees below horizontal and 20 degrees above horizontal, between 10 degrees below horizontal and 10 degrees above horizontal, between 5 degrees below horizontal and 5 degrees above horizontal, and/or adjustable at any suitable angle or range of angles. In some aspects, the fifth joint 114 may be adjustable at any angle above horizontal including, for example, between 0 degrees and 90 degrees above horizontal, between 0 degrees and 45 degrees above horizontal, between 0 degrees and 30 degrees above horizontal, between 0 degrees and 20 degrees above horizontal, between 0 degrees and 10 degrees above horizontal, between 0 degrees and 5 degrees above horizontal, and/or adjustable at any suitable angle or range of angles. In the same way, in some aspects, the fifth joint 114 may be adjustable at the same angles or at any angle below horizontal.

The stand 150 may also be referred to as a wafer holder, a wafer connection stand, an induction alignment stand, and/or any other suitable term. The stand 150 may include some or all of a base plate 602, a spring 604, an upper plate 620, one or more lock screws 622, one or more guide bushings 624, one or more clamps 626, and/or one or more knobs 628. For the sake of brevity, this disclosure will discuss the one or more lock screws 622, the one or more guide bushings 624, the one or more clamps 626, and/or the one or more knobs 628 as singular; however, it should be understood that any aspects discussed herein may include one or more lock screws 622, one or more guide bushings 624, one or more clamps 626, and/or one or more knobs 628. For example, in some aspects, the stand 150 may include one, two, three, four, five, six and/or any other suitable number of the one or more lock screws 622, the one or more guide bushings 624, the one or more clamps 626, and/or the one or more knobs 628.

The spring 604 may also be referred to as a wire holder, a wire securement device, an alignment spring, an aligner, and/or any other suitable term. The spring 604 may be secured to the base plate 602 using fasteners. In some aspects, the spring 604 may be secured to the base plate 602 at 2 points. In some aspects, the longitudinal axis of the spring 604 may be fully or substantially parallel to the bottom edge of the base plate 602. In some aspects, the spring 604 may be positioned a set distance away from the clamp 626 such that the spring 604 ensures a convenient assembly distance between the wire ends and the wafer connector is met, thereby providing room for a user to manipulate the wires as he or she electrically connects the wires to a wafer connector secured in the wafer connector clamp 626. It should be understood that depending on the implementation, the distance between the spring 604 and the clamp 626 may be any distance including, for example, 3.9 inches, 4 inches, between 3.5 inches and 4.5 inches, between 3 inches and 5 inches, between 1 inch and 7 inches, and/or and other suitable distance or range of distances.

The upper plate 620 may also be referred to as a plate, a second plate, and/or any other suitable term. The upper plate 620 may be secured to the upper surface of the base plate 602. In some aspects, the upper plate 620 may be two or more separate pieces each secured to the base plate 602.

In some aspects, the fifth joint 114 (FIG. 1) may allow the head assembly 120 (FIG. 1) to pivot such that a bottom surface of the head assembly 120 and/or the one or more bottom plates 306 are fully or substantially parallel to a top surface of the stand 150, the upper plate 620, the base plate 602, the connector 502, and/or the clamp 626.

The lock screw 622 may also be referred to as a guide bushing lock screw and/or any other suitable term. The lock screw 622 may secure the guide bushing 624 in place. In some aspects, the lock screw 622 size may be adjustable to accommodate different sizes of guide bushings 624.

The guide bushing 624 may also be referred to as a bushing, an alignment structure, a second alignment structure, and/or any other suitable term. The guide bushing 624 may couple with the guide pin 308 to align the coil 118 with the stand 150. In some aspects, the number of guide bushings 624 may be equal to the number of guide pins 308. In some aspects, the stand 150 may include two guide bushings 624 each positioned adjacent to one of the upper corners of the upper plate 620. In some aspects, the stand 150 may include two guide bushings 624 each positioned adjacent to one of the lower corners of the upper plate 620. In some aspects, the stand 150 may include four guide bushings 624 each positioned adjacent to one of the corners of the upper plate 620. The guide pin 308 may have a suitably sized diameter to allow the guide pin 308 to be slidably received in the opening of the guide bushing 624. In some aspects, the size of the hole in the guide bushing 624 may be adjustable to accommodate different sizes of guide pins 308. It should be understood, that in some aspects, the guide bushings 624 may instead be positioned on the head assembly 120 and the guide pins 308 may instead be positioned on the stand 150 and may otherwise operate as discussed herein. It should be understood that in some aspects, that the guide bushing 624 and/or the guide pin 308 may instead be any other type of alignment structure including, for example, a tongue and groove, interlocking teeth, a ridge and a trench, overlapping tabs, interlocking hooks, magnets, and/or any other suitable structure for restricting at least one dimension of movement.

The clamp 626 may also be referred to as a wafer connector clamp and/or any other suitable term. The clamp 626 may secure the connector 502 to the upper plate 620 and the stand 150. In some aspects, the clamp 626 may be coupled to a knob 628 which may be adjusted to secure the clamp 626 and the connector 502 to the stand 150 prior to assembly. In some aspects, one clamp 626 may be universal meaning that the clamp 626 may be interchangeably used with multiple different types of connector 502 or any type of connector 502 as discussed herein. In some aspects, a clamp 626 may be specially designed to secure one type of connector 502 or a set of types of connectors 502 as discussed herein.

The knob 628 may also be referred to as a threaded stud knob, a threaded knob, the handle, a tightener, an adjuster, an actuator, and/or any other suitable term. Twisting the knob 628 may cause the clamp 626 to secure the connector 502 to the upper plate 620 and/or the stand 150. In some aspects, at least a portion of the upper part of the knob 628 may include a rough surface to facilitate the user and turning the knob 628. In some aspects, at least a portion of the upper part of the knob 628 maybe wider that a lower portion of the knob 628 to allow the user to grip the knob more easily. It should be understood that in some aspects, that the knob 628 may instead be any type of tightening mechanism including, for example, a vice, a clip, a band, a magnet, and/or any other suitable tightening device. In some aspects, the knob 628 may be threadably perceived in a threaded opening of the clamp 626. Thus, in some aspects, the knob 628 may be threadably coupled to the clamp 626.

The magnet 650 may also be referred to as a magnet base or by any other suitable term. The magnet 650 may include some or all of a magnet body 652 and/or a switch 654. At least the portion of the magnet body 652 may be positioned under the base plate 602. The switch 654 may turn the magnet 650 on and off. In some aspects, the switch 654 maybe a dial which allows the user to incrementally adjust the strength of the magnet and the magnetic field produced by the magnet 650. In some aspects, the magnetic force of the magnet 650 will attract the metal components of the connector 502. In some aspects, the magnetic attraction between the connector 502 and the magnet 650 will help secure the connector 502 to the upper plate 620 and the stand 150 during assembly of the wire harness. In some aspects, the magnetic attraction between the wires 702 and the magnet 650 will help secure the wires 702 in position relative to the connector 502 and/or the stand 150 during assembly of the wire harness. In some aspects, the magnetic attraction between the wires 702 and the connector 502 and the magnet 650 will help secure the wires 702 and the connector 502 in position relative to the stand 150 during assembly of the wire harness.

In some aspects, the height of the magnet 650 maybe adjustable to allow the user to adjust the angle θ of the stand 150 as discussed herein. In some aspects, at least the portion of the top surface of the magnet 650 may include a padded or soft material to support the bottom surface of the base plate 602 when the base plate 602 is positioned on the magnet 650.

In some aspects, the magnet 650 may be coupled to the head assembly 120. Thus, in some aspects, the head assembly may include a slot between the coil 118 and the magnet 650 and the stand 150 may be positioned in the slot during assembly of the wire harness.

Figure 7:
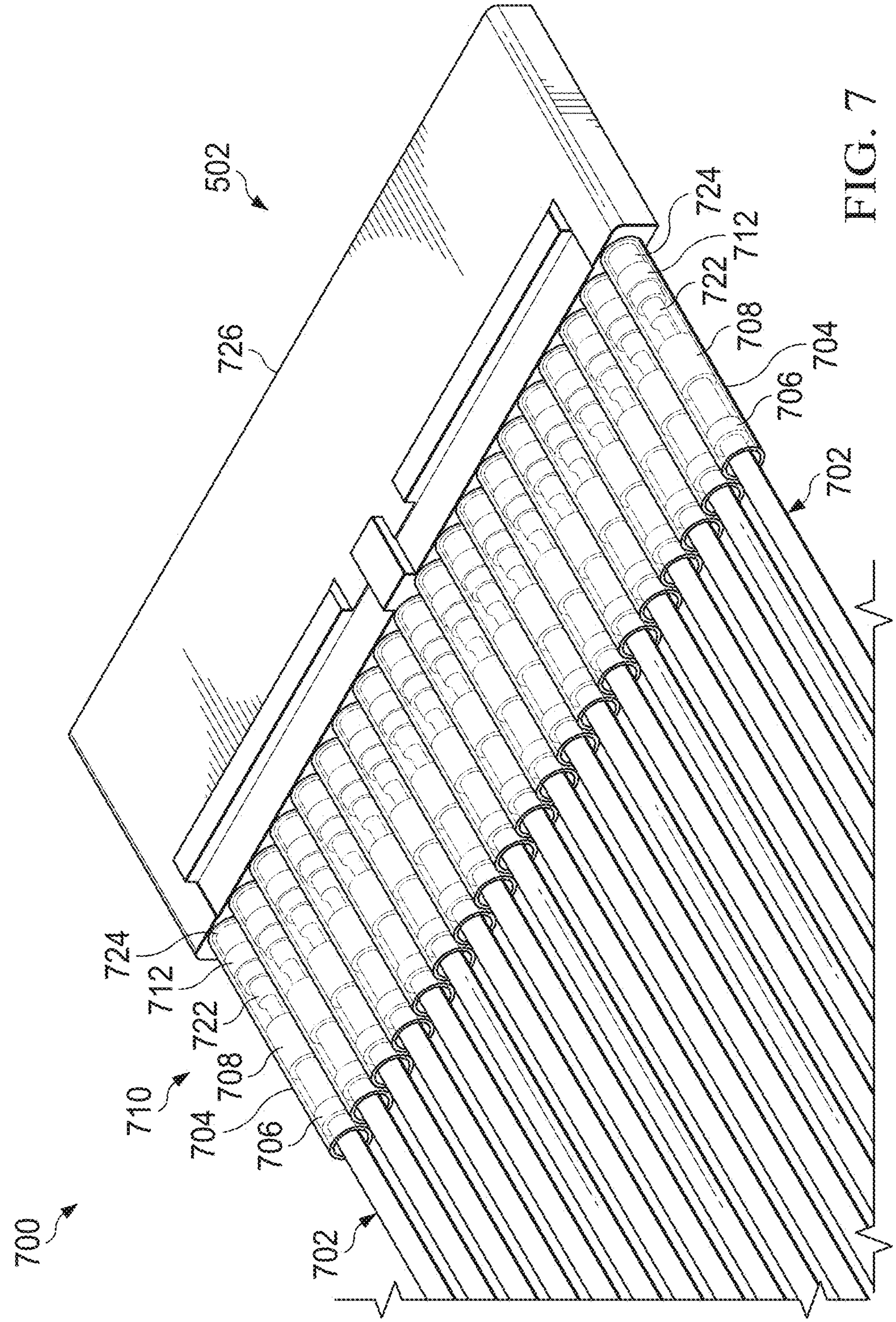
FIG. 7 is a perspective view of a portion of an example wire harness assembly, according to some aspects of the present disclosure.

FIG. 7 is a perspective view of a portion of an example wire harness assembly 700, according to some aspects of the present disclosure. The wire harness assembly 700 may also be referred to as a wire harness, a cable harness, a wiring harness, a cable assembly, a wiring assembly, a wiring loom, and/or any other suitable term. The wire harness assembly 700 may include some or all of one or more wires 702, one or more solder sleeve assemblies 710, and/or one or more connectors 502. For the sake of brevity, this disclosure will discuss the one or more wires 702, the one or more solder sleeve assemblies 710, and/or the one or more connectors 502 as singular; however, it should be understood that any aspects discussed herein may include one or more wires 702, one or more solder sleeve assemblies 710, and/or one or more connectors 502 and/or that a connector 502 may couple with one or more wires 702 and/or one or more solder sleeve assemblies 710. The solder sleeve assembly may couple and/or seal the wire 702 to the connector 502.

The wire 702 may be any type of wire including, for example, a stranded electrical wire having a single-conductor, multi-conductor, twisted pair, coaxial, and/or any other type of suitable wire. In some aspects, various wires of different may have outer sheaths of different colors to assist in identifying the wires during assembly.

Depending on the example, the solder sleeve assembly 710 may include some or all of translucent tubing 704, a first seal 706, a solder ring 708, and/or a second seal 712. In some aspects, the solder sleeve assembly 710 may be a double sealed solder sleeve assembly. In some aspects, the solder sleeve assembly 710 may be a Tyco P/N: CTA-0025 solder sleeve.

The translucent tubing 704 may make up the outer layer of the solder sleeve assembly 710. The translucent tubing 704 may allow a user to visually inspect and monitor the connection before and after the soldered connection. In the example herein, the translucent tubing 704 may have a first opening adjacent to the first seal 706 and a second opening adjacent to the second seal 712. In some aspects, the wire 702 may be inserted into the first opening adjacent to the first seal 706 before the soldering process. In some aspects, a portion of the connector 502 may be inserted into the second opening adjacent to the second seal 712 before the soldering process. In some aspects, the translucent tubing 704 may be heat shrink tubing which may shrink as heat is applied to form an outer seal around the interface between the wire 702 and the connector 502. In some aspects, the translucent tubing may have a length long enough to extend from a portion of the connector to a distance from the end of the wire 702 adjacent to the connector 502. It should be understood that, in some aspects, the translucent tubing 704 may instead not be translucent.

The first seal 706 may seal the translucent tubing 704 to the end of the wire 702. In some aspects, the first seal 706 may have material properties similar to the translucent tubing 704 allowing the first seal 706 to form a heat shrink seal around the end of the wire 702. In some aspects, the first seal 706 may be a different color from the second seal 712 so that the first seal 706 may be distinguished from the second seal 712 during assembly of the wire harness assembly 700. The outer surface of the first seal 706 may contact the inner surface of the translucent tubing 704.

The second seal 712 may seal the translucent tubing 704 to a portion of the connector 502. In some aspects, the second seal 712 may have material properties similar to the translucent tubing 704 allowing the first seal 706 to form a heat shrink seal around a portion of the connector 502. In some aspects, the second seal 712 may be a different color from the first seal 706 so that the second seal 712 may be distinguished from the first seal 706 during assembly of the wire harness assembly 700. The outer surface of the second seal 712 may contact the inner surface of the translucent tubing 704.

The solder ring 708 may be the source of soldering material for soldering the wires 702 to an electrically conducting portion of the connector 502. The solder ring 708 may be positioned exactly or substantially in the middle of the translucent tubing 704 between the first opening adjacent to the first seal 706 and the second opening adjacent to the second seal 712. The outer surface of the solder ring 708 may contact the inner surface of the translucent tubing 704. The solder ring 708 may be made of any material used for soldering including, for example, one or more of metal, metal alloy, tin-lead, tin-silver, and tin-copper, and/or any other suitable soldering material. The material(s) of the solder ring 708 may have a melting point lower or significantly lower than the other components of the wire harness assembly 700.

The connector 502 may also be referred to as a multi-socket connector, a wafer, wafer connector, adapter, and/or any other suitable term. The connector 502 may include some or all of one or more solder terminals 722, one or more base sleeves 724, and/or a connector body 726. For the sake of brevity, this disclosure will discuss the one or more solder terminals 722 and/or the one or more base sleeves 724 as singular; however, it should be understood that any aspects discussed herein may include one or more solder terminals 722 and/or one or more base sleeves 724 and/or that a connector 502 may include one or more solder terminals 722 and/or one or more base sleeves 724 to couple with the one or more wires 702 and/or the one or more solder sleeve assemblies 710. Depending on the implementation, the connector 502 may any type of wafer connector including, for example, a 1 inch Wafer-B side-Pin (e.g., Tyco P/N: MTCB1X-XXX-105), 1 inch Wafer-A Side-Socket (e.g., Tyco P/N: MTCB1X-105-XXX), 1 inch Wafer-B Side-Socket (e.g., Tyco P/N: MTCB1X-XXX-106), 1 inch Wafer-A side-Socket (e.g., Tyco P/N: MTCB1X-106-XXX), 2 inches Wafer-A side-Pin (e.g., Tyco P/N: MTCB2X-205-XXX), 2 inches Wafer-B Side-Pin (e.g., Tyco P/N: MTCB2X-XXX-205), 2 inches Wafer-B side-Socket (e.g., Tyco P/N: MTCB2X-XXX-206), 2 inches Wafer-A side-Socket (e.g., Tyco P/N: MTCB2X-206-XXX), and/or any other suitable wafer connector. Depending on the implementation, the connector 502 may be any size including, for example, a 1 inch wafer or a 2 inch wafer. In some aspects, a "socket" connector may be a connector 502 with a male end, which includes the solder terminals 722 and the base sleeves 724 and a female end which includes one or more sockets (not shown) on the opposite side of the connector body 726. In some aspects, a "pin" connector may be a connector 502 with a male end, which includes the solder terminals 722 and the base sleeves 724 and another male end (not shown in FIG. 7) on the opposite side of the connector body 726. Aspects with a "pin" connector are discussed further herein (e.g., FIG. 11). In some aspects, the female end of a "socket" connector may mate with the male end of a "pin" connector (opposite the solder terminals 722).

As discussed herein, in some aspects, the clamp 626 may be specifically size to clamp one or more types of connectors 502. In some aspects, the clamp 626 may be sized for the 1 inch "A" pin wafer and/or the 1 inch "B" socket wafer. In some aspects, the clamp 626 may be sized for the 1 inch "B" pin wafer and/or the 1 inch "A" socket wafer. In some aspects, the clamp 626 may be sized for the 2 inch "A" pin wafer and/or the 2 inch "B" socket wafer. In some aspects, the clamp 626 may be sized for the 2 inch "B" pin wafer and the 2 inch "A" socket wafer. In some aspects, the clamp 626 sized for a 1 inch connector may include 10 markings to mark the positions of the wires 702 in the connector 502, since the connector 502 may not be visible or fully visible. In some aspects, the clamp 626 sized for a 2 inch connector may include 20 markings to mark the positions of the wires 702 in the connector 502, since the connector 502 may not be visible or fully visible.

The solder terminal 722 may also be referred to as an input, plug, terminal, connection point, jack, and/or any other suitable term. Depending on the implementation, the solder terminal 722 may be made of any electrically conducting material including, for example, one or more of copper, aluminum, steel, silver, and/or any other suitable material.

The base sleeve 724 may be positioned between the extending end of the solder terminal 722 and the connector body 726. Thus, the base sleeve may provide structural support for at least a portion of the solder terminal 722 coupling to the connector body 726.

The connector body 726 may make up the body of the connector 502. In some aspects, the connector body 726 may include a soldering end which may include the one or more solder terminals 722 and/or the one or more base sleeves 724. In some aspects, the connector body 726 may include a connecting end opposite the soldering end. When the connector 502 is male, the connecting end may include one or more electrically conducting male protrusions. When the connector 502 is female, the connecting end may include electrically conducting sockets. The internal portion of the connector body 726 may include electrically conducting material connecting the one or more solder terminals 722 with the electrically conducting portions of the connecting end. In some aspects, the connector body 726 may include one or more protrusion or one or more recesses positioned on the outer surface of the connector body 726 which facilitate a user is holding the connector 502 and disconnecting and/or connecting the connector 502.

Figure 8:
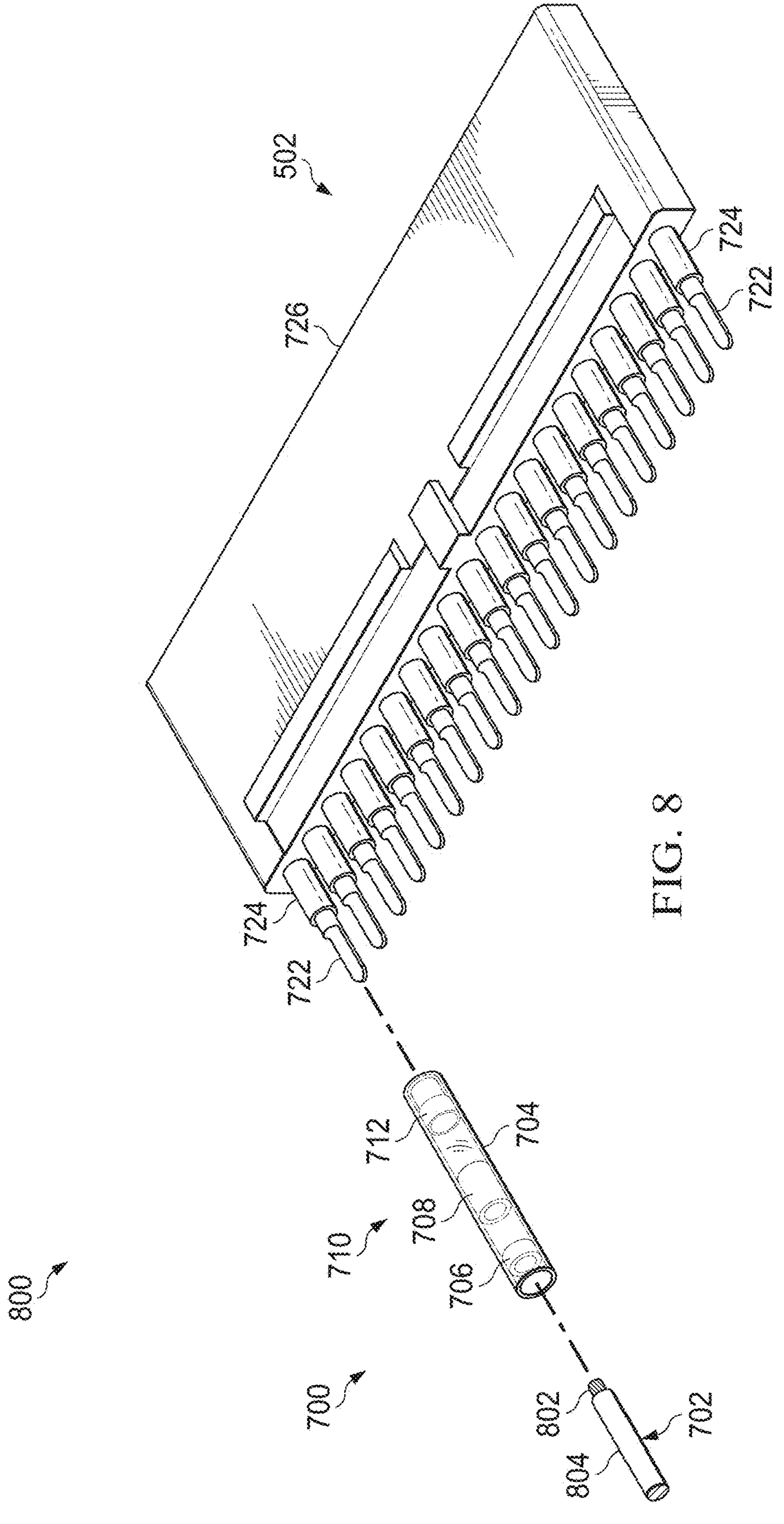
FIG. 8 is an exploded perspective view of a portion of an example wire harness assembly, according to some aspects of the present disclosure.

FIG. 8 is an exploded perspective view 800 of an example wire harness assembly 700, according to some aspects of the present disclosure. FIG. 8 is an exploded view 800 of a portion of the wire harness assembly 700. The wire 702 may include one or more conductors including, for example, conductor 802. The conductor 802 may be the electrically conducting portion of the wire 702. The conductor 802 may be soldered to the solder terminal 722 by the melting of the solder ring 708 during the wire attachment process. In some aspects, the solder sleeve assembly 710 may be placed over the solder terminal 722 and/or the base sleeve 724 and/or in a manner that the end of the solder sleeve assembly adjacent the second seal 712 contacts a surface of the connector body 726. Then, an end of the wire 702 may be inserted into the first opening of the solder sleeve assembly 710 adjacent the first seal 706 and pushed forward until the conductor 802 contacts the solder terminal 722 within the inner portion of the solder ring 708. In this position, the wire harness assembly 700 may be ready for heating. The heating may melt the solder ring 708 causing the conductor 802 to electrically couple with the solder terminal 722. In some aspects, the heating may cause the translucent tubing 704 to heat shrink around the outer coating 804 of the wire 702, the base sleeve 724, the first seal 706, and/or the second seal 712. In some aspects the first seal 706 may seal the translucent tubing 704 about the outer surface of the wire 702 and the second seal 712 may seal the translucent tubing about the base sleeve 724. In some aspects, once the solder ring 708 fuses the conductor 802 to the solder terminal 722, the material of the solder ring 708 may be referred to as the solder reflow area.

Figure 9:
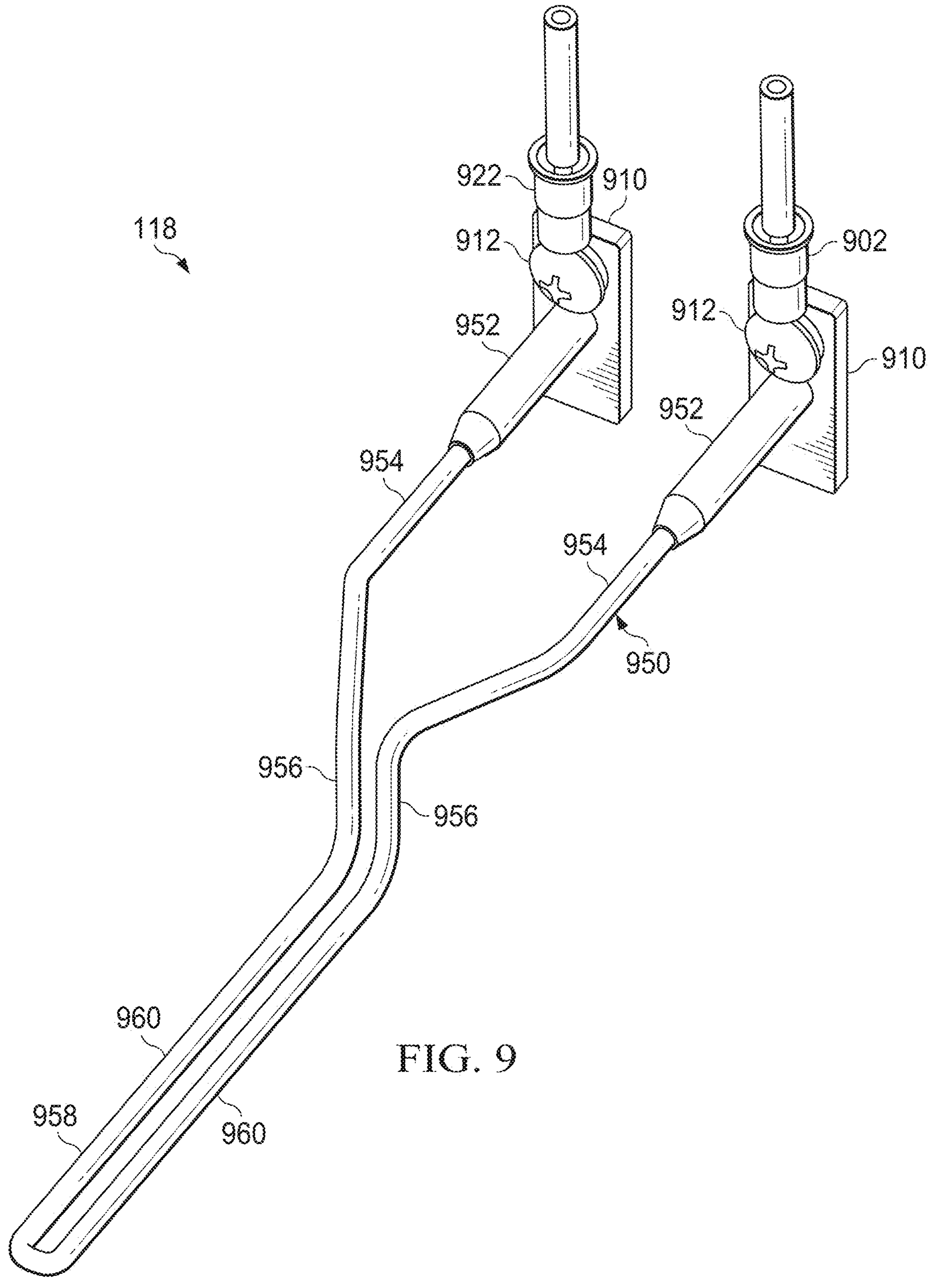
FIG. 9 is a perspective view of an example coil, according to some aspects of the present disclosure.

FIG. 9 is a perspective view of an example coil 118, according to some aspects of the present disclosure. The coil 118 may also be referred to as an induction heater coil, an induction coil and/or any other suitable term. The coil 118 may include an input ring terminal 902, an output ring terminal 922, one or more coil mounting plates 910, one or more coil securement devices 912, and the coil body 950.

The input ring terminal 902 may also be referred to as a ring terminal, a first ring terminal, a terminal, an input, an input terminal, and/or any other suitable term. The input ring terminal 902 may electrically couple the coil 118 to the power supply 116.

The output ring terminal 922 may also be referred to as a ring terminal, a second ring terminal, a terminal, an output, an output terminal, and/or any other suitable term. The output ring terminal 922 may electrically couple the coil 118 to the power supply 116. The electrical current may flow from the input ring terminal 902 to the output ring terminal 922.

The one or more coil mounting plates 910 may be coupled to the coil mounting bracket 302 and/or The head assembly 120. Thus, in some aspects, the one or more coil mounting plates 910 may secure the coil 118 to the head assembly 120. In some aspects, a coil mounting plate 910 may be positioned at each end of the coil 118.

The one or more coil securement devices 912 may secure the coil 118 to the coil mounting bracket 302 and the head assembly 120 and/or may secure the input ring terminal 902 and the output ring terminal 922 to the coil 118. Thus in some aspects, the one or more coil securement devices 912 may electrically couple the input ring terminal 902 and the output ring terminal 922 to the coil body 950. In some aspects, the coil 118 may include two coil securement devices 912 each coupled to one of two coil mounting plates 910.

The coil body 950 may include one or more coil base supports 952, a coil upper portion 954, a coil central portion 956, and a coil lower portion 958. The one or more coil base supports 952 may extend from one of the one more coil mounting plates 910. The coil upper portion 954 may extend from the one or more coil base supports 952. The coil central portion 956 may extend from the coil upper portion 954. The coil lower portion 958 may extend from the coil central portion 956 and may be comprised of two parallel arms 960. In some aspects, the coil 118 may be a rods or tubes with generally a U-shape. The coil upper portion 954 may comprise two fully or substantially parallel rods or tubes extending from the coil base supports 952. In some aspects, the coil central portion 956 may include two converging rods or tubes sloping downwardly to a plane below the coil upper portion 954. In some aspects, the coil lower portion 958 may include a U-shaped rod or tube in which the ends of the U-shape are fully or substantially parallel to each other. In some aspects, the fully or substantially parallel rods or tubes of the coil lower portion 958 may be positioned relatively close together (e.g., within less than 1") compared to the rods or tubes of the coil upper portion 954 such that the coil lower portion 958 creates a strong but small heat zone and/or avoids or has low cancellation between the induction currents, magnetic field, and/or eddy currents. In some aspects, the heat zone may be a volume including the interface between the one or more wires 702 and the connector 502 which may be targeted for heating by the induction coil. In some aspects, the heat zone may extend fully or substantially along the longitudinal length of the coil lower portion 958 and may be exactly or approximately less than 1" by 1" in cross section along its length. In some aspects, the fully or substantially parallel rods or tubes of the coil lower portion 958 may be positioned relatively close together (e.g., within less than 1") compared to the distance of the coil 118 from the solder ring 708 and/or compared to the depth or width of the heat zone. In some aspects, the coil lower portion 958 may be positioned in an entirely different horizontal plane than the coil upper portion 954. Thus, in some aspects, the coil central portion 956 constitutes most of or the entire change in height of the coil body 950.

The stand 150 may support the connector 150 such that the one or more independent wires 702 may be coupled with the connector 502 along a linear interface, each wire of the one or more independent wires 702 may be independently connectable to a respective socket of the multi-socket connector 502. In some aspects, the interface may be positioned within the heating zone.

Figure 10:
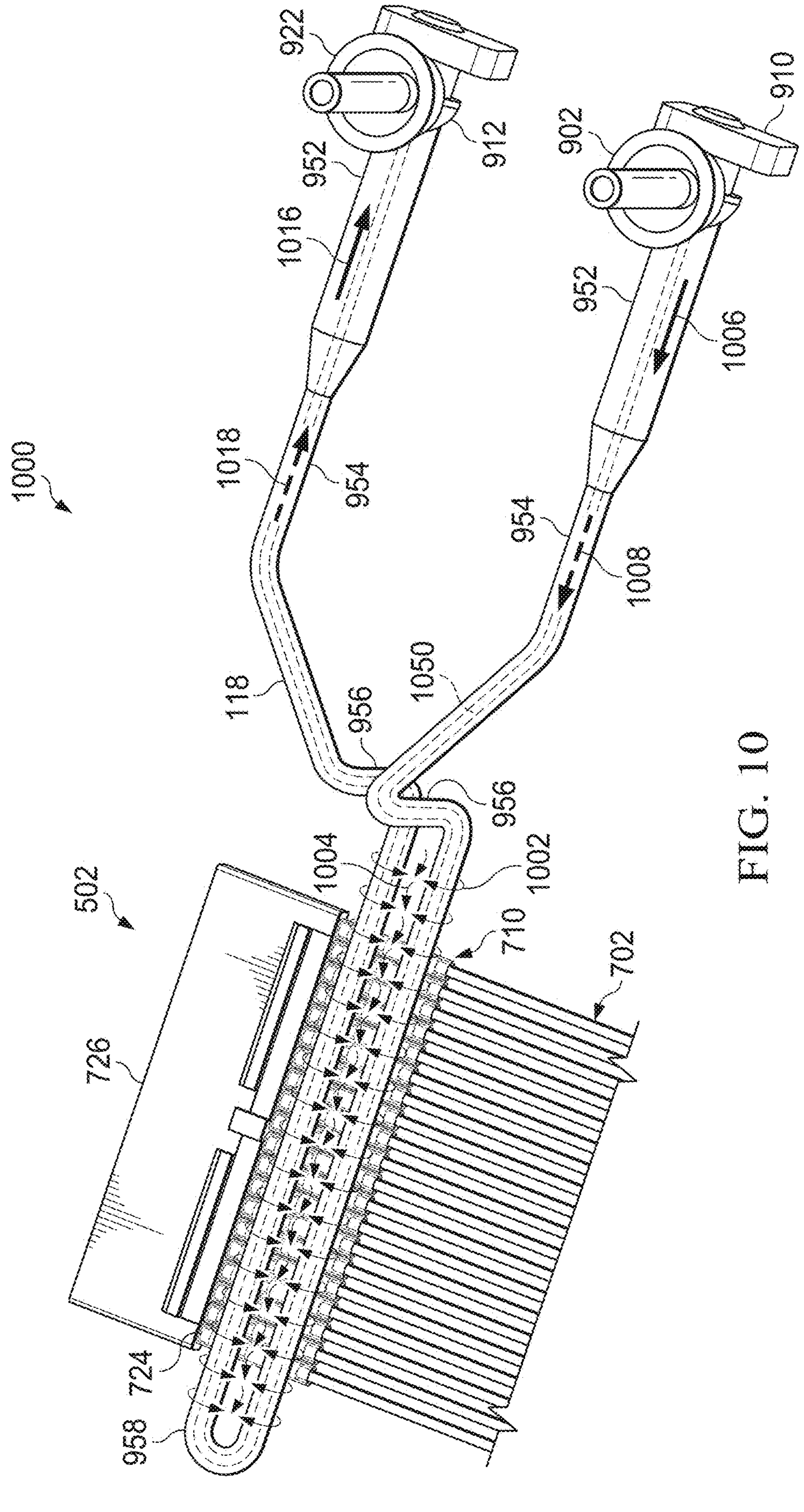
FIG. 10 is a perspective view of an example induction heating system, according to some aspects of the present disclosure.

FIG. 10 is a perspective view of an example induction heating system 100, according to some aspects of the present disclosure. The input electric current 1008 enters the coil 118 through the input ring terminal 902, travels through the coil 118, and exits the coil 118 as output electric current 1018 through the output ring terminal 922. The electric current traveling through the coil 118 may create magnetic flux 1002 and eddy currents 1004 in the directions shown in FIG. 10. As shown in FIG. 10, the coil lower portion 958 lies across and adjacent the solder sleeves 710 usable to connect the wires 702 and the solder terminals 722 of the connector 502. Even still, in some implementations, the coil lower portion 958 is free of contact with the solder sleeves, the wires, or the solder terminals. In this implementation, the coil lower portion 958 is disposed on only one side. However, the solder sleeves, the wires, or the solder terminals are close enough to be disposed in the flux field and/or heat zone so as to have eddy currents generated therein.

The magnetic flux through a surface may be the surface integral of the normal component of the magnetic field over that surface. In electromagnetism, an eddy current (also called Foucault's current) is a loop of electric current induced within conductors by a changing magnetic field in the conductor according to Faraday's law of induction or by the relative motion of a conductor in a magnetic field. Eddy currents flow in closed loops within conductors, in planes perpendicular to the magnetic field. They can be induced within nearby stationary conductors by a time-varying magnetic field created by an alternating current (AC) electromagnet or transformer. The magnitude of the current in a given loop is proportional to the strength of the magnetic field, the area of the loop, and the rate of change of flux, and inversely proportional to the resistivity of the material. When graphed, these circular currents within a piece of metal look vaguely like eddies or whirlpools in a liquid.

In some aspects, the coil 118 acts as an electromagnet and/or an electronic oscillator that passes a high-frequency alternating current (AC) through the electromagnet. The rapidly alternating magnetic field penetrates the solder ring 708, generating electric currents inside the solder ring 708 called eddy currents. The eddy currents flow through the resistance of the solder ring's 708 material, and heat the solder ring 708 by Joule heating. The frequency of the electric current needed for induction heating depends on, for example, the solder ring's 708 size, material type, and/or distance from the coil 118.

In some aspects, the induction heating of the coil 118 may only apply heat to the solder ring 708 leaving mostly unaffected the nonmetal and higher melting point materials of all the remaining components. For example, in some aspects the conductor 802, the solder terminal 722, and/or the other metal components of the connector 502 may be constructed of metals with a higher melting point than the solder ring 708.

In some aspect, it may be preferable to moderate the heating of the coil 118 using a cooling fluid, such as water. However, it should be understood that, in some aspects, other types of cooling fluids and coolants other than water may be used. In some aspects, the interior of the coil 118 includes a conduit 1050 which extends the length of the coil 118. In some aspects, water enters the conduit 1050 of the coil 118 at a fluid inlet 1006, flow through the conduit 1050 of the coil 118, and exits the conduit 1050 of the coil 118 at the fluid outlet 1016. In some aspects, during heating, as the water flows through the conduit 1050 of the coil 118, the water absorbs heat from the coil 118 and transfers the heat and the heated water back to the water chiller 106 to be cooled. The cooling properties of the water in the conduit 1050 of the coil 118 may act as a thermal balance to the heating of the coil 118. In some aspects, the speed of the water flow in the conduit 1050 of the coil 118 and the amperage of the electric current in the coil 118 may be adjusted to finely control the induction heating process. In some aspects, the temperature of the water in the conduit 1050 of the coil 118 and the amperage of the electric current in the coil 118 may be adjusted to finely control the induction heating process.

In some aspects, the coil 118 may positioned fully on one side of the solder ring 708. Thus, in some aspects, a plane may be positioned between the coil 118 and the solder ring 708 such that no portion of coil 118 extends beyond the plane. In some aspects, the electrically active portion of the coil 118 suspends entirely above the solder ring 708 during heating. In some aspects, no portion of the coil 118 is closer to a solder ring 708 than another discontinuous portion of the coil 118.

In some aspects, the induction heating system 100 and/or the controller 104 may be preprogrammed for output power, frequency, voltage, cycle time, chilled water temperature, and/or distance and position between the induction coil and solder sleeves. The coil 118 may heat all solder sleeve assemblies 710 simultaneously in set time intervals allowing for an even reflow on all solder sleeve assemblies 710. In some aspects, the coil 118 melts the solder only, leaving solder sleeve assemblies 710 and connector 502 unaffected. For example, the set time interval may be 60 seconds, 45 seconds, 30 seconds, 25 seconds, 15 seconds, ten seconds, 5 seconds, and/or any other suitable time period. In some aspects, the heating process may occur until strands of the conductor 802 of the wires 702 are at least partially visible through the translucent tubing 704. However, in some aspects, the clamp 626 may fully or partially cover the interface between the conductor 802 of the wire 702, the solder sleeve assembly 710, and/or the connector 502 such that the interface is not visible. Thus, in some aspects, use of a set time interval as discussed herein may be preferable to ensure proper soldering. In some aspects, the clamp 626 may be fully or partially transparent to allow for visibility of the interface between the conductor 802 of the wire 702, the solder sleeve assembly 710, and/or the connector 502 during heating.

Precise heating of the interface between the conductor 802 of the wire 702, the solder sleeve assembly 710, and/or the connector 502 may prevent the insulation of the wires 702 from melting. If the interface does not receive adequate heat, the solder sleeve assembly 710 may not adequately bind the wires 702 to the connector 502 and/or the interface between the wires 702 and the connector 502 may be too rigid and may not allow adequate bending.

In some aspects, the controller 104 may be equipped to adjust one or more parameters related to the heating of the coil 118. In some aspects, the controller 104 may be able to adjust any parameter relating to the induction heating system 100 including, for example, the electric frequency through the coil 118, the voltage of the coil 118, the electric current flowing through the coil 118, the power transmitted to the coil 118, the temperature of the coil 118, the heat cycle duration, the positioning of the coil 118 relative to the solder ring 708, the distance between the coil 118 and solder sleeve assembly 710, cooling fluid temperature, cooling fluid flow rate, and the thermal impact on adjacent components, the solder ring's 708 thermal properties (e.g., melting point, resistivity, etc.), and/or any other suitable parameter. It should be understood that, depending on the implementation, the controller 104 may control all of these listed parameters or any combination of these parameters and/or that some or all of these parameters may be instead controlled by different parts of the induction heating system 100 including, for example, the power supply 116, a second controller mounted on the head assembly 120, the water chiller 106, a processor, a computer, a mobile device, a smartphone, a tablet, and/or any other suitable user interface. In some aspects, the controller 104 may include a program in which a user can save specific parameter values into memory to allow the user to quickly access parameter values for specific heating and manufacturing applications. In some aspects, the memory may be pre-installed with specific parameter values for pre-defined heating and manufacturing configurations. For example, in some aspects, the controller may include data relating to specific parameters for 1 inch connectors, 2 inch connectors, and/or different wire 702 types.

In some aspects, the electric frequency through the coil 118 may be measured in kHz and may be any value include, for example, between 0 to 2000 kHz, between 500 to 1500 kHz, between 600 to 1,200 kHz, between 700 to 1000 kHz, between 750 to 900 kHz, and/or any other suitable frequency or range of frequencies.

In some aspects, the voltage of the coil 118 may be measured in volts and may be any value include, for example, between 0 to 50 V, between 0 to 30 V, between 0 to 15 V, between 0 to 11 V, and/or any other suitable voltage or range of voltages.

In some aspects, the electric current flowing through the coil 118 may be measured in amps and may be any value include, for example, between 0 to 1000 amps, between 0 to 750 amps, between 0 to 600 amps, between 0 to 510 amps, and/or any other suitable current or range of current values.

In some aspects, the power transmitted to the coil 118 may be measured in kilowatts and may be any value include, for example, between 0 to 20 kVA, between 0 to 15 kVA, between 0 to 10 kVA, between 0 to 5 kVA, and/or any other suitable power or range of power values.

In some aspects, the temperature of the coil 118 may be measured in degrees Fahrenheit and may be any value include, for example, between 0 to 500 degrees, between 0 to 250 degrees, between 0 to 125 degrees, between 0 to 100 degrees, between 0 to 75 degrees, between 212 to 900 degrees, between 400 to 750 degrees, between 500 to 700 degrees, between 550 to 650 degrees, and/or any other suitable temperature or range of temperatures.

In some aspects, the heat cycle duration may be measured in seconds and may be any value include, for example, between 0 to 60s, between 0 to 45s, between 0 to 30s, between 0 to 25s, between 0 to 20s, between 0 to 10s, between 0 to 5s, and/or any other suitable time or time interval.

In some aspects, the positioning of the coil 118 relative to the solder ring 708 may be measured in inches and may be any value include, for example, between 0 to 5", between 0 to 2", between 0 to 1", between 0 to 0.5 inches, between 0 to 0.25 inches, between 0 to 0.125 inches, between 0 to 0.0625 inches, and/or any other suitable distance or range of distances.

In some aspects, the distance between the coil 118 and solder sleeve assembly 710 may be measured in inches and may be any value include, for example, between 0 to 5", between 0 to 2", between 0 to 1", between 0 to 0.5 inches, between 0 to 0.25 inches, between 0 to 0.125 inches, between 0 to 0.0625 inches, and/or any other suitable distance or range of distances.

In some aspects, cooling fluid temperature may be measured in degrees Fahrenheit and may be any value include, for example, room temperature, between 32 to 104 degrees, between 40 to 80 degrees, between 45 to 65 degrees, between 50 to 60 degrees, and/or any other suitable temperatures or range of temperatures.

In some aspects, cooling fluid flow rate may be measured in gallons per minute (GPM) and may be any value include, for example, between 1 to 10 GPM, between 1 to 7 GPM, between 1 to 5 GPM, between 1 to 3 GPM, between 1 to 2 GPM, and/or any other suitable flow rate or range of flow rates.

In some aspects, the thermal impact on adjacent components may be measured in may be measured in kilowatts and may be any value include, for example, between 0 to 20 kW, between 0 to 15 kW, between 0 to 10 kW, between 0 to 5 kW, and/or any other suitable power or range of power values.

It should be understood that, in some aspects, application of at least some of the parameter values or ranges discussed herein to the heat zone or interface between the wires 702 and the connector 502 may allow for even heating across the heat zone or interface, may allow for a small heat zone which avoids other nearby non-solderable components (e.g., the outer coating 804 of the wires 702, the other portions of the connector 502, and/or the stand 150), a high degree of heating temperature accuracy (e.g., within 1 to 5 degrees Fahrenheit), prevent the coil 118 from direct contact with the interface and/or the wires 702, and/or may prevent the wires 702 from burning or fusing together.

Depending on the implementation, either direct current (DC) or AC electric current may be transmitted through the coil 118. In some aspects, DC current may not have a frequency. In some aspects, AC current may include the frequency values and ranges as discussed herein. For example, in aspects, the AC current may be a high frequency sine wave.

Figure 11:
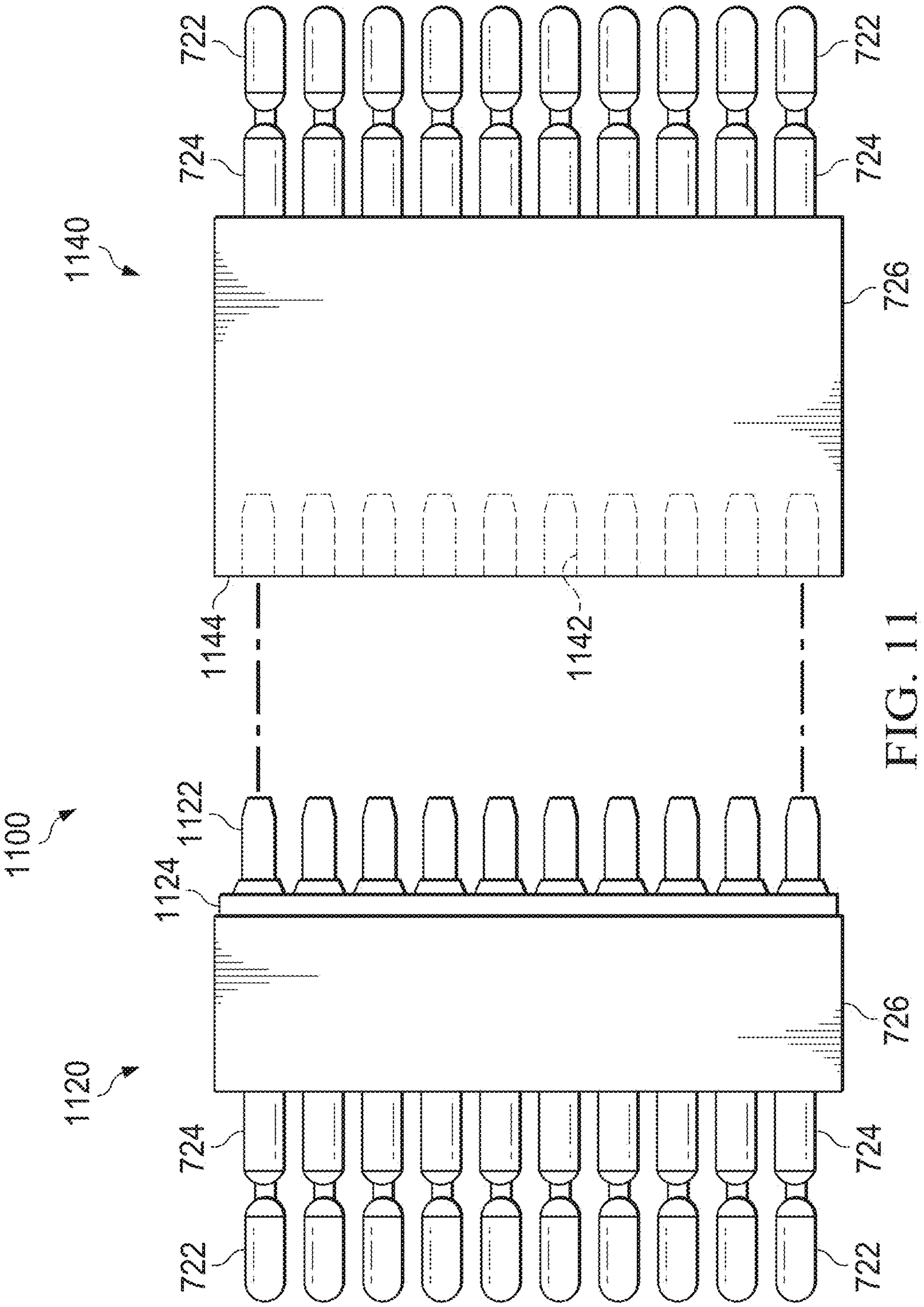
FIG. 11 is a top views of examples of connectors, according to some aspects of the present disclosure.

FIG. 11 is a top view 1100 of examples of connectors 1120, 1140, according to some aspects of the present disclosure. FIG. 11 is a view 1100 of a male connector 1120 and a female connector 1140, respectively. These may fit together to provide an electrical connection as desired. As also discussed in relation to at least FIGS. 7 and 8, in some aspects, the connector 502 may be a male connector 1120 or a female connector 1140. Thus, it should be understood that any aspects of the disclosure including at least any aspects discussed in relation to FIGS. 7 and 8 involving the connector 502 may also apply to the male connector 1120 or the female connector 1140. In some aspects, the soldering end of the male connector 1120 and/or the female connector 1140 may be substantially similar to the soldering end of the connector 502. Thus, any aspects of the wire harness manufacturing process discussed herein may be applied both the male connector 1120 and the female connector 1140.

In some aspects, the male connector 1120 may include some or all of a one or more pins 1122 and/or a layer 1124. The pins 1122 may connect with one of one or more sockets 1142 on the female connector 1140 electrically coupling the male connector 1120 and the female connector 1140. In some aspects, the male connector may include the layer 1124 disposed between a portion of the one or more pins 1122 and the connector body 726. The layer 1124 may reduce wear on the male connector 1120 by the leading end 1144 of the connector body 726 of the female connector 1140 and/or may help secure the sockets 1142 to the pins 1122.

Figure 12:
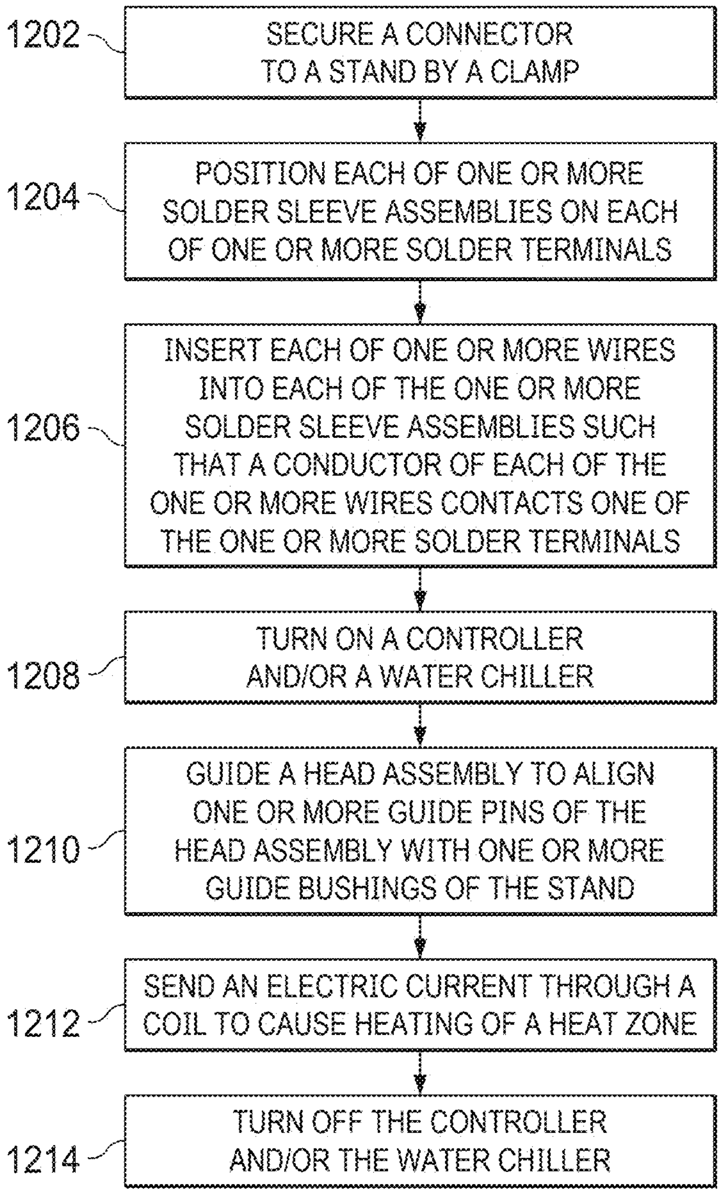
FIG. 12 is an illustrative method for efficiently applying heat to solder wires to a wafer connector in a wire harness, according to some aspects of the present disclosure.

FIG. 12 is an illustrative method 1200 for efficiently applying heat to solder wires to a wafer connector in a wire harness, according to some aspects of the present disclosure. In some aspects, the method 1200 may be a method of connecting wires to a connector wafer, as may be done when manufacturing a wire harness, such as wire harness assembly 700.

At process 1202, the connector 502 may be secured to the stand 150 by the clamp 626. This may include using the threaded stud knob 328 to loosen the clamp 626, introducing the connector between the clamp 626 and the upper plate 620. The threaded stud knob 328 may then be tightened to secure the connector in place on the stand 150.

At process 1204, the each of the one or more solder sleeve assemblies 710 may be positioned on each of the one or more solder terminals 722. In some aspects, this may include manually introducing the solder terminals 722 of the connector into an open end of the solder sleeve assembly 710.

At process 1206, each of the one or more wires 702 may be inserted into each of the one or more solder sleeve assemblies 710 in a manner that the conductor 802 of each of the one or more wires 702 contacts one of the one or more solder terminals 722. The body of the wires 702 may be at least partially secured in place by the wire holder or spring 604 so as to reduce the change of the wire being inadvertently displaced before the wire is soldered in place to the solder terminal.

At process 1208, the controller 104 and/or the water chiller 106 may be powered on. In some aspects, this is done with a user interface, such as the buttons and other examples described herein.

At process 1210, the user may guide the head assembly 120 using the arm assembly 108 to align the one or more guide pins 308 of the head assembly 120 with the one or more guide bushings 624 of the stand 150. This may help secure the coil 118 in the proper location to heat and melt the solder with the wires arranged along a single plane.

At process 1212, an electric current may be sent through the coil 118 to cause heating of the heat zone. As shown in and as described with reference to FIG. 10, the coil may be disposed at a precise distance relative to the solder terminals 722 or solder ring 708 (based on the guide pins) so that the solder terminals and/or solder rings are disposed within the magnetic flux 1002 and subjected to the eddy currents to heat and melt the solder. Due to the shape of the coil, the eddy currents are able to simultaneously generate heat within the solder of the solder sleeves even though the wires and the solder sleeves are arranged in the single plane. Due to the arrangement of the coil and the placement of the head assembly, each of the solder sleeves may be subjected to a relatively equal amount of eddy current, as indicated by a proper and secure electrical connection of the wires to the connectors.

At process 1214, after a time interval, the controller 104 and/or the water chiller 106 may be turned off. This may be controlled to reduce the chance of inadvertently overheating the solder sleeves, which can result in a suspect connection or no connection at all.

With the wires having been simultaneously soldered to the connectors, the head assembly 120 may be removed from the stand 150, and the connector and wires may be removed from the stand. In this manner, more than one wire may be simultaneously soldered to a connector along a single plane.

In some aspects, a plurality of stands 150 may be positioned in rows and/columns on an elevated table to allow for assembly of multiple wire harnesses in quick succession. Thus, in some aspects, the user may guide the head assembly 120 along the rows and/or column of stands to solder each wire harness in quick succession. Thus, in some aspects, the elevated table may form an assembly line of wire harnesses during wires harness manufacturing.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A connector and wire connecting system, comprising:

a work head movable relative to a wafer holder, the work head comprising:

a first alignment structure secured in place on the work head and movable with the work head relative to the wafer holder;

an induction heater comprising an induction coil having a first terminal and a second terminal, the induction coil having substantially parallel arms, the induction coil being fixed in a position relative to the first alignment structure when the work head is moved relative to the wafer holder, wherein the induction coil is configured in a manner that an electric current flows through the induction coil from the first terminal to the second terminal, the electric current creating an electromagnetic field adjacent to the induction coil forming a heating zone; and the wafer holder configured to directly secure a wafer connector and a plurality of wires in a row to define a linear interface, each wire of the plurality of wires being independently connectable to a respective pin of the wafer connector and being independently connectable to a respective sleeve assembly, the linear interface being placeable within the heating zone when the work head is moved relative to the wafer holder, the wafer holder comprising:

a body comprising a wafer support surface directly below the wafer connector when the wafer connector is directly secured by the wafer holder;

a wafer restraint configured to directly secure the wafer connector in position on the wafer support surface;

a wire restraint configured to directly secure a portion of each wire of the plurality of wires in position relative to the body, the wire restraint spaced apart from the wafer restraint and at least a portion of the wire restraint being fixed in position relative to the wafer restraint; and a second alignment structure comprising a second shape physically engageable with the first shape of the first alignment structure to prevent relative displacement of the work head and the wafer holder in a plurality of directions while giving freedom of movement in another direction and to align the parallel arms of the induction coil at a position adjacent to only one side of the linear interface and substantially parallel to the linear interface, wherein the induction coil is disposed relative to the wafer holder and is configured to heat the linear interface between the wafer connector and the plurality of wires within the heating zone.

2. The connector and wire connecting system of claim 1, wherein the wafer holder comprises a plate configured to be angled at a first angle relative to horizontal, wherein when the electric current flows through the induction coil, at least one linear portion of the induction coil is configured to be angled at a second angle relative to horizontal, the second angle being substantially equal to the first angle.

3. The connector and wire connecting system of claim 1, wherein the induction heater comprises a lift assistance device, comprising:

a first arm coupled to a base at a first joint;

a second arm coupled to the first arm at a second joint; and a third arm coupled to the second arm at a third joint, and wherein movement of the second arm about the second joint and movement of the third arm about the third joint allow the induction coil to move freely in three dimensions.

4. The connector and wire connecting system of claim 1, wherein the induction coil comprises a U-shaped tube forming a distal end of the induction coil.

5. The connector and wire connecting system of claim 4, wherein the U-shaped tube comprises a length greater than a length of a wafer connector supported by the wafer holder.

6. The connector and wire connecting system of claim 1, wherein the wafer holder is configured in a manner that a connection point between each wire of the plurality of wires and the wafer connector is visible from above by a user when the wafer connector and the plurality of wires are directly secured by the wafer holder and wherein each wire of the plurality of wires is configured to be coupled to the wafer connector with the sleeve assembly, the sleeve assembly comprising a translucent tubing.

7. The connector and wire connecting system of claim 1, wherein the wafer holder is configured to allow accessibility of a user to each wire of the plurality of wires in a manner that each wire of the plurality of wires is configured to be coupled to the wafer connector with a sleeve assembly, the sleeve assembly comprising a solder ring comprising a first metal, wherein the wafer connector comprises an electrically conducting portion comprising a second metal, and wherein the first metal has a lower melting point than the second metal.

8. The connector and wire connecting system of claim 1, wherein the induction coil is selectively disposable adjacent the wires in manner that when the electric current flows through the induction coil, the induction coil is on a single side of the plurality of wires.

9. The connector and wire connecting system of claim 1, wherein the induction coil comprises at least one substantially linear portion spaced from the first terminal and the second terminal.

10. A connector and wire connecting system, comprising:
- a work head movable relative to a wafer holder, the work head comprising:
  - a first alignment structure secured in place on the work head and movable with the work head relative to the wafer holder;
  - an induction heater comprising an induction coil having a first terminal and a second terminal, wherein the induction coil is configured in a manner that an electric current flows through the induction coil from the first terminal to the second terminal, the electric current creating an electromagnetic field adjacent to the induction coil forming a linearly extending heating zone adjacent to and not between the induction coil, the induction coil having substantially parallel arms, the induction coil being fixed in a position relative to the first alignment structure when the work head is moved relative to the wafer holder;
- a wafer connector with a plurality of wires along a linear interface, the linear interface being placeable within the heating zone, each wire of the plurality of wires being independently connectable to a respective pin of the wafer connector along a linear interface length, the heating zone having a linear length the same as or greater than the linear interface length; and
- the wafer holder configured to directly secure a wafer connector and a plurality of wires in a row to define a linear interface, each wire of the plurality of wires being independently connectable to a respective pin of the wafer connector and being independently connectable to a respective sleeve assembly, the linear interface being placeable within the heating zone when the work head is moved relative to the wafer holder, the wafer holder comprising:
  - a body comprising a wafer support surface directly below the wafer connector when the wafer connector is directly secured by the wafer holder;
  - a wafer restraint configured to directly secure the wafer connector in position on the wafer support surface;
  - a wire restraint configured to directly secure a portion of each wire of the plurality of wires in position relative to the body, the wire restraint spaced apart from the wafer restraint and at least a portion of the wire restraint being fixed in position relative to the wafer restraint; and
  - a second alignment structure comprising a second shape physically engageable with the first shape of the first alignment structure to prevent relative displacement of the work head and the wafer holder in a plurality of directions while giving freedom of movement in another direction and to align the parallel arms of the induction coil at a position adjacent to only one side of the linear interface and substantially parallel to the linear interface; and
- wherein the induction coil is disposed relative to the wafer connector and is configured to heat the linear interface between the wafer connector and the plurality of wires within the heating zone.

11. The connector and wire connecting system of claim 10, wherein the induction coil comprises at least two parallel arms disposed to generate a magnetic field extending along the linearly extending heating zone.

12. A connector and wire connecting system, comprising:
- a work head movable relative to a wafer holder, the work head comprising:
  - a first alignment structure secured in place on the work head and movable with the work head relative to the wafer holder;
  - an induction heater comprising an induction coil having a first terminal and a second terminal, the induction coil having substantially parallel arms, the induction coil being fixed in a position relative to the first alignment structure when the work head is moved relative to the wafer holder,
  - wherein the induction coil is configured in a manner that an electric current flows through the induction coil from the first terminal to the second terminal, the electric current creating an electromagnetic field adjacent to the induction coil forming a heating zone; and
- the wafer holder configured to directly secure a wafer connector and a plurality of wires in a row to define a linear interface, each wire of the plurality of wires being independently connectable to a respective pin of the wafer connector and being independently connectable to a respective sleeve assembly, the linear interface being placeable within the heating zone, the wafer holder comprising:
  - a body comprising a plate, the plate directly below the wafer connector when the wafer connector is directly secured by the wafer holder;
  - a clamp configured to directly secure the wafer connector in position on the wafer support surface;
  - a wire holder configured to directly secure a portion of each wire of the plurality of wires in position relative to the body, the wire holder spaced apart from the plate and at least a portion of the wire holder being fixed in position of the wafer holder relative to the plate; and
  - a second alignment structure comprising a second shape, the second shape of the second alignment structure configured to be physically engageable with the first shape of the first alignment structure to prevent relative displacement of the work head and the wafer holder in a plurality of directions while giving freedom of movement in another direction and to align the parallel arms of the induction coil at a position adjacent to only one side of the linear interface and substantially parallel to the linear interface; and
- wherein the induction coil is disposed relative to the wafer holder and is configured to heat the linear interface between the wafer connector and the plurality of wires within the heating zone.

13. The connector and wire connecting system of claim 12, wherein the wafer holder comprises a plate configured to be angled at a first angle relative to horizontal, wherein when the electric current flows through the induction coil, at least one linear portion of the induction coil is configured to be angled at a second angle relative to horizontal, the second angle being substantially equal to the first angle.

14. The connector and wire connecting system of claim 12, wherein the induction heater comprises a lift assistance device, comprising:

a first arm coupled to a base at a first joint;

a second arm coupled to the first arm at a second joint; and a third arm coupled to the second arm at a third joint, and wherein movement of the second arm about the second joint and movement of the third arm about the third joint allow the induction coil to move freely in three dimensions.

15. The connector and wire connecting system of claim 12, wherein the induction coil comprises a U-shaped tube forming a distal end of the induction coil.

16. The connector and wire connecting system of claim 15, wherein the U-shaped tube comprises a length greater than a length of a wafer connector supported by the wafer holder.

17. The connector and wire connecting system of claim 12, wherein the wafer holder is configured in a manner that a connection point between each wire of the plurality of wires and the wafer connector is visible from above by a user when the wafer connector and the plurality of wires are directly secured by the wafer holder and wherein each wire of the plurality of wires is configured to be coupled to the wafer connector with the sleeve assembly, the sleeve assembly comprising a translucent tubing.

18. The connector and wire connecting system of claim 12, wherein the wafer holder is configured to allow accessibility of a user to each wire of the plurality of wires in a manner that each wire of the plurality of wires is configured to be coupled to the wafer connector with a sleeve assembly, the sleeve assembly comprising a solder ring comprising a first metal, wherein the wafer connector comprises an electrically conducting portion comprising a second metal, and wherein the first metal has a lower melting point than the second metal.

19. The connector and wire connecting system of claim 12, wherein the induction coil is selectively disposable adjacent the wires in manner that when the electric current flows through the induction coil, the induction coil is on a single side of the plurality of wires.

20. The connector and wire connecting system of claim 12, wherein the induction coil comprises at least one substantially linear portion spaced from the first terminal and the second terminal.

21. The connector and wire connecting system of claim 1, wherein the attachment of the first alignment structure to the second alignment structure limits movement of the induction coil in at least one horizontal direction.

22. The connector and wire connecting system of claim 1, wherein the wafer restraint is a clamp and the wire restraint is a spring.

* * * * *